United States Patent
McAvoy

(10) Patent No.: US 7,177,653 B2
(45) Date of Patent: Feb. 13, 2007

(54) MOBILE USER POSITION LOCATING SYSTEM

(75) Inventor: Derek McAvoy, Toronto (CA)

(73) Assignee: Bell Mobility Inc., Toronto (CA)

( * ) Notice: Subject to any disclaimer, the term of this patent is extended or adjusted under 35 U.S.C. 154(b) by 216 days.

(21) Appl. No.: 10/942,862

(22) Filed: Sep. 17, 2004

(65) Prior Publication Data

US 2005/0064879 A1    Mar. 24, 2005

(30) Foreign Application Priority Data

Sep. 19, 2003  (CA)  .................... PCT/CA03/01427

(51) Int. Cl.
*H04Q 7/20* (2006.01)

(52) U.S. Cl. .............. 455/456.1; 455/456.2; 455/456.5; 455/456.6; 455/436; 455/439; 455/442; 455/445

(58) Field of Classification Search ............ 455/456.1, 455/456.2, 456.5, 456.6, 466, 7, 11.1, 13.1, 455/446, 436, 439, 442, 445; 342/450, 457
See application file for complete search history.

(56) References Cited

U.S. PATENT DOCUMENTS

| | | | |
|---|---|---|---|
| 5,519,621 A | 5/1996 | Wortham | |
| 5,652,707 A | 7/1997 | Wortham | |
| 5,687,212 A | 11/1997 | Kinser, Jr. et al. | |
| 5,790,634 A | 8/1998 | Kinser, Jr. et al. | |
| 5,844,522 A | 12/1998 | Sheffer et al. | |
| 5,873,040 A | 2/1999 | Dunn et al. | |
| 6,115,596 A | 9/2000 | Raith et al. | |
| 6,148,202 A | 11/2000 | Wortham | |
| 6,405,213 B1 | 6/2002 | Layson et al. | |
| 6,463,287 B1 | 10/2002 | Wegner | |
| 2003/0134648 A1* | 7/2003 | Reed et al. .................. | 455/456 |
| 2003/0162550 A1 | 8/2003 | Kenzaburo et al. | |
| 2004/0048568 A1* | 3/2004 | Soliman .................... | 455/13.1 |
| 2004/0266338 A1* | 12/2004 | Rowitch ......................... | 455/7 |

FOREIGN PATENT DOCUMENTS

| | | |
|---|---|---|
| CA | PCT/CA2003/001428 | 7/2004 |
| EP | 1 284 579 A1 | 2/2003 |
| GB | 2 378 614 A | 2/2003 |
| WO | WO 02/47406 A2 | 6/2002 |
| WO | WO 02/087275 A2 | 10/2002 |
| WO | WO 03/039037 A1 | 5/2003 |
| WO | WO 03/065757 A1 | 8/2003 |
| WO | WO 03/098951 A1 | 11/2003 |
| WO | WO 2004/023678 A2 | 3/2004 |

\* cited by examiner

*Primary Examiner*—Joseph Feild
*Assistant Examiner*—Khai Nguyen

(57) ABSTRACT

A method and system for locating a mobile user of one or more mobile users while on a call in a wireless telecommunication network utilizes a decision network that determines if the call signal is propagating through a repeater station. When the call is propagating through a repeater station, the decision network alters the signal measurement parameters to correspond with the location of the mobile user relative to the repeater station co-ordinates. By revising signal measurement parameters to compensate for repeater stations, the present invention provides for improved position estimates of the location of the mobile user in the network. For multiple cell soft handoff conditions, the decision network utilizes trained neural networks.

33 Claims, 10 Drawing Sheets

MOBILE USER POSITION LOCATING SYSTEM

FIELD OF THE INVENTION

The present invention relates to a method and system for locating one or more mobile users while on a call in a wireless telecommunication network and, in particular, relates to a decision network that determines if the call signal is propagating through a repeater station.

BACKGROUND OF THE INVENTION

It should be understood that the term "mobile user" used throughout the specification includes mobile telecommunication units that communicate with a base station in a wireless telecommunication network by means of electromagnetic waves such as mobile wireless telephones and cellular telephones that are designed to exchange voice information with the base station. The term mobile user also includes hybrid devices such as personal communications systems that have both telephone and data communication features.

It is known to use a wireless network based location system to locate the position of an active phone or a transceiver unit in a network. Once such system is disclosed in U.S. Pat. No. 5,844,522 issued Dec. 1, 1998 to Sheffer et al. This system includes a plurality of agile vector sensor units for which one is installed at each antenna site in the network and the remote control monitoring station to which the wireless network users can call for assistance in the event of an emergency. The system is designed to locate a portable phone transceiver unit using the reverse voice channel signal transmitted by the transceiver unit. This is a real time position locator for the mobile telephone in the system and is responsive to an emergency condition.

However, this real time position location system involves additional equipment to be utilized at each cell site adding to the capital cost of the network.

Further, utilizing the base station cell site call record information does not provide for accurate position estimation of a mobile user because the network contains several repeater stations that amplify the signals propagating between the base station cell sites and the mobile users through repeater stations as well as change propagation delay time and phase between the base station cell site and the mobile user.

Accordingly, there is a need to develop a tracking and analyzing system for locating mobile users in a network over a given time period and within particular regions of the network that is not subject to errors introduced by the call signal propagating through a repeater station.

SUMMARY OF THE INVENTION

A method and system for locating one or more mobile users while on a call in a wireless telecommunication network utilizes a decision network that determines if the call signal is propagating through a repeater station. When the call is propagating or being routed through a repeater station, the decision network alters at least one distance related measurement parameter to correspond with the location of the mobile user relative to the repeater station co-ordinates. By revising the at least one distance related measurement parameter to compensate for repeater stations, the present invention provides for improved position estimates of the location of the mobile user in the network. For multiple cell soft handoff conditions, the decision network utilizes trained neural networks.

The system is responsive to a call history database, in one embodiment located in the network, for storing a log of call history information records of the mobile user while on a call. The call history information records each comprises measurement parameters selected from the group comprising round trip delay (RTD) measurements, power strength measurement messages (PSMM), base station cell site co-ordinates, repeater co-ordinates, cell antenna azimuth, and repeater antenna azimuth.

The system further comprises a position estimating processor that determines a position estimate for the mobile user, when the call is not routed through a repeater, based on the base station cell site co-ordinates and at least one distance related measurement parameter. In one embodiment, the distance related parameters comprise an appropriate one of the RTD and PSMM measurements. The position estimate processor also determines a repeater modified position estimate, when it is determined that the call is routed through a repeater, by modifying the at least one distance related measurement parameter to reflect signal propagation delays associated with the repeater. The position estimator uses the modified distance related measurement parameter with the repeater co-ordinates to determine the modified repeater position estimate.

The system may further include a first filter for receiving the position estimate and the repeater position estimate from the position estimating processor to refine the position estimate and the repeater position estimate. In one embodiment the first filter comprises a Kalman filter.

The system may further include a second reverse filter responsive to the last record of a call for reverse filtering the refined position estimates and repeater position estimates to further refine all the refined position and repeater position estimates. In one embodiment the second reverse filter comprises a reverse Kalman filter.

The decision network comprises a single cell processor for determining if the RTD measurements in one direction are less than one way delay through the repeater and transmission time from the base station cell site to the repeater, and for discarding the RTD measurement when it is greater than the one-way delay through the repeater and transmission time from the base station cell site to the repeater. The decision network further comprises an RTD neural network and a PSMM neural network.

The RTD neural network is trained for each location between at least two cell sites with a plurality of predetermined normal and repeater enhanced RTD measurements to develop normal RTD measurement patterns and repeater enhanced RTD measurement patterns. The RTD neural network further comprises a comparator for comparing the RTD measurement of a call history record with normal and repeater enhanced RTD patterns to determine if the RTD measurement is being routed through a repeater.

The PSMM neural network is trained for each location between at least three cell sites with normal and repeater enhanced PSMM measurements to develop normal PSMM measurement patterns and repeater enhanced PSMM patterns. The PSMM neural network further comprises a comparator for comparing the PSMM measurement of a call history record with normal and repeater enhanced PSMM patterns to determine if the PSMM measurement is being routed through the repeater.

The position estimate processor determines the position estimate and the repeater modified position:

a) where the RTD message is from one cell site, the position estimator utilizes a triangulation algorithm utilizing the RTD measurement and the cell antenna azimuth of the single cell site measurement;

b) where the call history record comprises a plurality of RTD measurements from a corresponding plurality of cell sites, utilizing a circular trilaterating algorithm using appropriate RTD and modified RTD measurements; and, c) where the call history record comprises PSMM messages from at least three corresponding cell sites, utilizing a hyperbolic trilaterating algorithm using the appropriate PSMM and modified PSMM measurements.

In accordance with one aspect of the present invention there is provided a system for locating a mobile user in a wireless communication network. The system comprises a decision network for determining if the call is being routed through a repeater for each of the call history information records and a position estimating processor responsive to the decision network for determining a position estimate of the mobile user. The position estimator, when the call is not routed through a repeater, determines the position estimate based on base station cell site co-ordinates and at least on distance related measurement parameter. The position estimator further determines a repeater modified position estimate, when the call is routed through a repeater, by the distance related measurement parameter to reflect signal propagation delays associated with the repeater and utilizing the modified distance related measurements with the repeater co-ordinates to determine the modified repeater position estimate.

In accordance with another aspect of the present invention there is provided a method of locating a mobile user in a wireless communication network comprising the steps of:

receiving a log of call history information records of the mobile user while on a call, the call history information records each comprising at least one distance related measurement parameter;

determining if the call is being routed through a repeater for each of the call history information records;

determining a position estimate of the mobile user, when the call is not routed through a repeater, based on base station cell site co-ordinates and the at least one distance related measurement; and, determining a repeater modified position estimate, when the call is routed through a repeater, by modifying the at least one distance related measurement parameter to reflect signal propagation delays associated with the repeater and utilizing the modified distance related measurement parameter with the repeater co-ordinates to determine the repeater modified position estimate.

In accordance with yet another aspect of the present invention there is provided an apparatus for locating a mobile user in a wireless communication network comprising:

means for receiving a log of call history information records of the mobile user while on a call, the call history information records each comprising at least one distance related measurement parameter;

means for determining if the call is being routed through a repeater for each of the call history information records;

means for determining a position estimate of the mobile user, when the call is not routed through a repeater, based on base station cell site co-ordinates and the at least one distance related measurement; and, means for determining a repeater modified position estimate, when the call is routed through a repeater, by modifying the at least one distance related measurement parameter to reflect signal propagation delays associated with the repeater and utilizing the modified distance related measurement parameter with the repeater co-ordinates to determine the repeater modified position estimate.

BRIEF DESCRIPTION OF THE DRAWINGS

For a better understanding of the nature and objects of the present invention reference may be had to the accompanying diagrammatic drawings in which.

DESCRIPTION OF THE INVENTION

Figure 1:
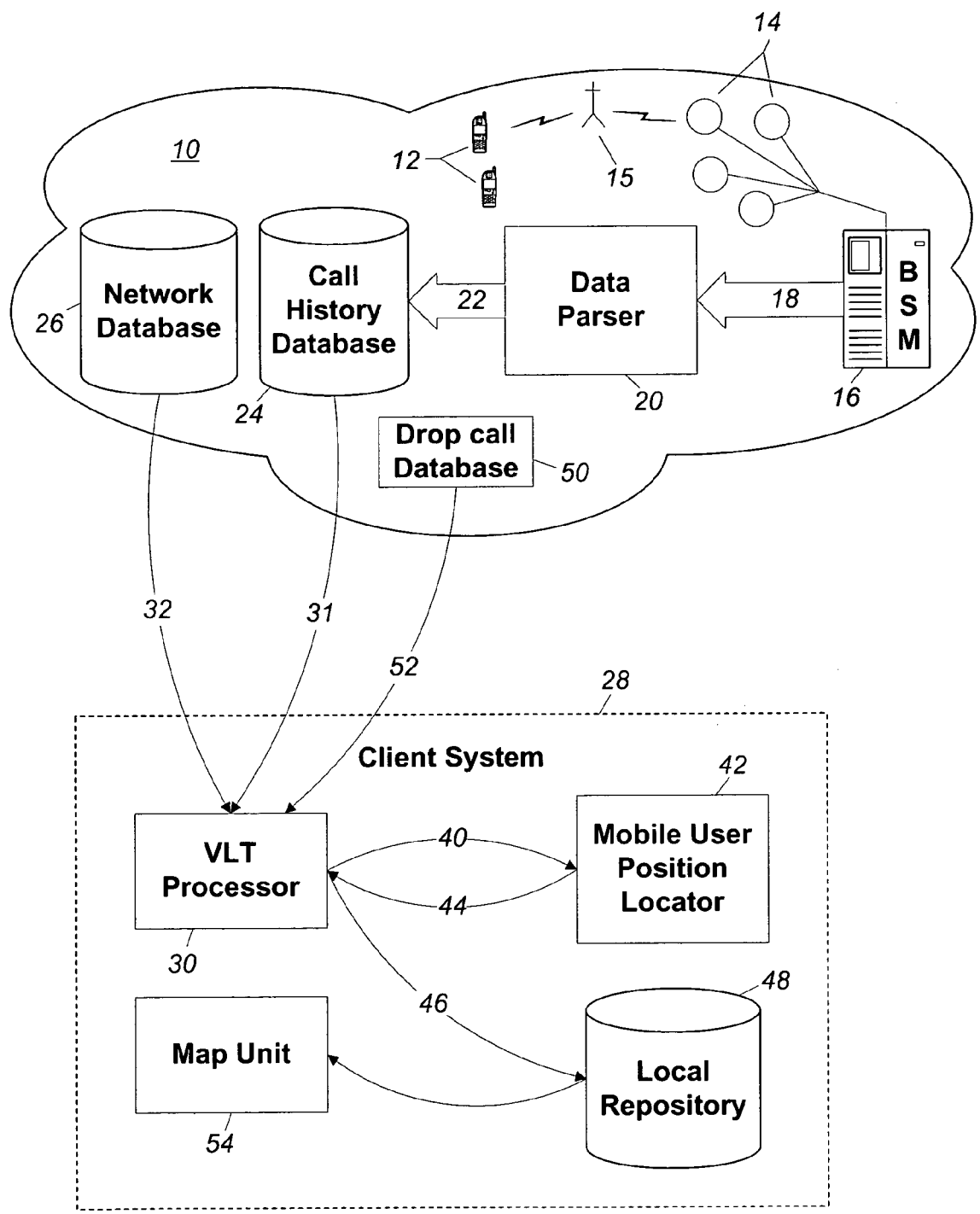
FIG. 1 is a schematic representation of the wireless telecommunication network of the present invention including the historical tracking analysis system.

The present invention relates to a method and system for locating a mobile user in a wireless communications network while on a call in the network. In particular, FIG. 1 shows the telecommunication network as a wireless cellular mobile telephone network 10 having multiple mobile users 12 connected to the network 10 by radio wave to cell sites 14. Each cell site 14 is controlled by a base station manager (BSM) 16 for the network 10. The BSM 16 controls mobile user radio coverage in a predetermined region of the network 10. For the purpose of the description that follows, the cell site 14 and term cell site base station, or base station cell site 14 may hereinafter be considered one and the same aspects of the network 10. It should be understood that a network 10 may have more than one BSM 16 and that each BSM 16 may control mobile user call connections in the network 10 through hundreds of cell sites 14. In addition the network 10 includes enhancers or repeaters 15 for improving signal levels from the cell site base station 14 to the mobile user 12. In some instances, radio signals between base station cell sites 14 may pass through an enhancer or repeater station 15 whereby the signal is amplified. The repeater 15 increases the cell site coverage area in network 10.

A base station manager (BSM) 16 in the network forwards raw data relating to telephone calls in progress by mobile users 12 in the network 10 along communication link 18 to the data parsing unit 20. The data parsing unit (VLT parser) 20 acts as a vehicle locating tool parser and filters the raw data relating to calls on the network. The VLT parser 20 forwards filtered data along communication link 22 to a call history database 24. The call history database 24 is also referred to as a vehicle locating database. The raw data forwarded along communication link 18 from BSM 16 to the data parser 20 includes all information data relating to calls in progress of all users in the network. This raw data information is forwarded either on a real time basis or is downloaded from BSM 16 to VLT parser 20 at set times throughout the day. The downloading of new data from the BSM occurs when the network is not operating at peak conditions and would normally occur in the early hours of the morning. It should be further understood that data parser 20 may receive raw data from more than one BSM 16 in the network. Further, for very large networks more than one data parser 20 may service the network.

The data parser 20 then filters the raw data received that typically comprises rows of information relating to the mobile user information data and associated call history information data. The mobile user information includes the telephone number of the customer of the mobile user and the call history information includes the date and time of the call, call duration and information relating to the relative position of the mobile user in the network relative to the cell sites 14 and repeaters 15 through which the mobile user 12 is connected to network 10. The call history database stores the filtered call history information data and mobile user information data in a relational database.

The network further includes a network database 26. The purpose of the network database 26 is to provide in a spread sheet fashion data relating to the network configuration. This includes the longitudinal and latitude information concerning the location of each of the cell sites 14 and repeaters 15 in the network 10 and antenna azimuth. The network database 26 is accessible by network administrators who update cell site and repeater configurations. Database 26 is maintained and updated by the network administrator when new cell sites and repeaters are added and when any changes are made to the cell site, and repeater configurations by network administrators.

A client system 28 comprises a computer program tool that may be operating on a personal computer that has secure internet or intranet access to the call history database 24 and the network database 26 in the network 10. This access is represented by communication lines or links 31 and 32 respectively to the call history database 24 and the network database 26. It should be understood that client system 28 access to the network 10 is controlled by a log on procedure which normally requires that a user log on with an identification user name and a password.

Figure 6:
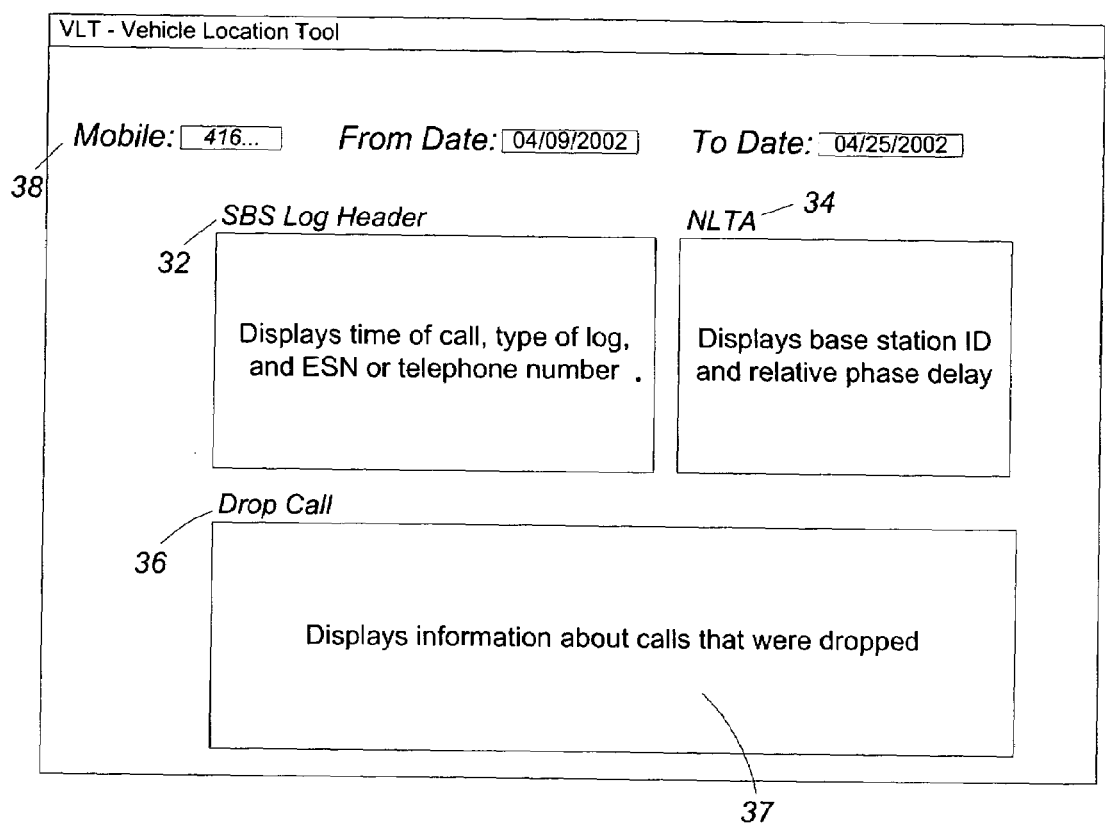
FIG. 6 is a screen showing the selection of historical data information.

In tracking or analyzing the mobile user information data associated with active calls in the network and the associated call history information data, a VLT processor 30 acts as an interface for the administrator to access the network information. The VLT processor 30 is also referred to as a vehicle location tool processor. The VLT processor 30 utilizes the personal computer a display screen that brings up an interface display similar to that shown in FIG. 6. FIG. 6 shows three types of logs as SBS (System Base Station) logs at 32, NLTA (Neighbor List Tuning Array) logs at 34 and drop call logs at 36. The SBS logs are logs that occurred in the system and show the time, the type of log and the ESN or telephone number. The NLTA log relates more to the base station ID and relative phase delay of signals received from a mobile user from these base stations. The drop call log 36 relates to calls that were interrupted and lost due to network malfunctions such as, for example, poor signal strength or high traffic density.

In order to see these logs, the administrator provides to the VLT processor 30 with parameters such as start time (GMT standard), the end time (GMT standard) and the mobile phone number. All these parameters can be entered in the controls on the tool bar 38.

Once all the parameters are provided, the data is loaded into the table 37 shown in FIG. 6.

To view available mobile users, an administrator selects parameters such as, for example, a date range the base station controller which tracks the mobile, the mobile range and/or pattern. If no base station controller is selected, the conditions based on the base station controller are not used. Once the list of mobiles are provided, the administrator has the option, for example, to select mobiles from the listings for determination of path of travel or location of dropped calls. Once the selection is made, the VLT processor 30 downloads the selected call information from the call history database 24 and downloads network configuration information associated with the call from network database 26. The administrator then selects the calls for position location analysis and in so doing the VLT processor 30 forwards this call history data information and associated network configuration information via communication link 40 to the mobile user position locator 42.

It should be understood that over a given period of time, the logs provided by the BSM 16 to the call history database 24 may be numerous. Further, the number of calls to be processed may be quite numerous and as a result, due to current processing times of computers and memory constraints, the processing by the position location of the location information of each of the mobile users 12 so requested by the VLT processor 30 may require several hours until the processing is complete.

In accordance with the present invention, the mobile user position locator 42 analyzes each call record and computes the relative position of the mobile user 12 relative to one or more base station cell sites 14 or repeater station location 15. The aspects of the mobile position estimator 42 of the present invention are described hereinafter in more detail.

Figure 2:
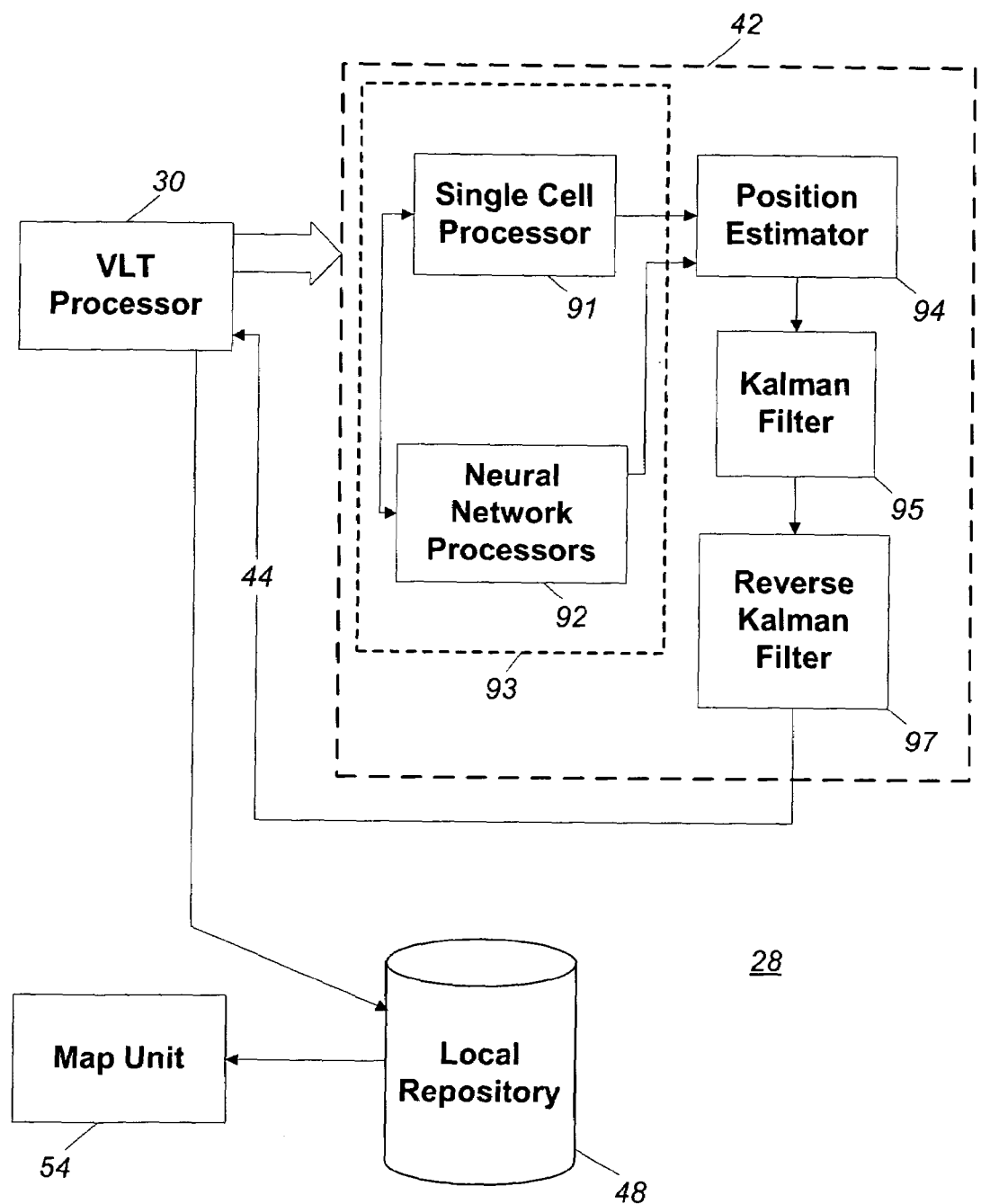
FIG. 2 is a schematic representation of a portion of the network and more detail of the client system.

Referring to FIG. 2, the VLT processor 30 forwards selected call history information and associated network configuration information to an enhancer decision network 93. Decision network 93 forms part of the mobile user position locator 42. The purpose of enhancer decision network 93 is to determine if the call history data information relates to a signal propagating through an enhancer or repeater station 15.

The decision network 93 has a single cell processor 91 and neural network processors 92. For call history information received from a single cell 14, the record is forwarded by VLT processor 30 to single cell processor 91. For multiple cell records associated with the same call, that is a record associated with multiple base stations because the mobile user 12 is in a soft handoff situation, the records are forwarded to neural network processors 92.

A single cell site record entering the single cell processor 91 has its location determined by RTD information. The RTD information comprises round trip delay information of the signal as it propagates from the base station to the mobile and returns back to the base station 14. In some instances, this propagation may be through a repeater station 15 and hence has greater delay. The purpose of the single cell processor 91 is to determine whether or not the propagation delay of the RTD record for the mobile user is associated with a repeater station 15. The single cell processor 91 has a predetermined delay time associated with a signal passing from the cell site to the repeater and through the repeater to the mobile station. If the RTD measurement is greater than this value, it cannot be ascertained whether or not the signal is passing through a repeater station or is in fact a significant distance away from the cell site. The single cell processor in this instance discards this value and will not provide this value to the position estimator 91. When the value is less than this normal delay propagation, there is a certainty that the signal is not propagating through a repeater and a position estimate will be calculated for the user. For a single cell reference, the position estimate processor uses a triangulation method whereby the time delay is representative of a distance from the base station and the azimuth of the base station together with the time delay give the coordinate of the mobile user relative to the base station.

In the event of multiple call records, it should be understood that these multiple call records may either have an RTD component or the Neighbor List Tuning Array (NLTA) information. This NLTA information is also referred to as PSMM messages which stands for Power Strength Measurement Messages which are related to phase delays between the cell sites involved in a soft hand off situation for the signal received by the mobile user. The neural network processors 92 have trained neural networks for both RTD measurements and PSMM measurements. When the actual measurement is received by the appropriate RTD or PSMM neural network processor 92, the measurement is placed within the trained neural network and the proximity of this measurement to known calculations result in the neural network determining whether a cell enhancer or repeater is involved in the propagation of the signal to the mobile user 12. If it is, a revised repeater position information is sent to the position estimating processor 94. If the neural network determines that the call has not passed through a repeater station 15, then the call history information is forwarded without revision to the position estimator 94. Hence the position estimator 94 performs the same tasks on call history data information and revised call history data information altered by the neural network processors 92. Alternatively, revision to call history data information could occur in the position estimator 94 prior to processing. In the instance where two cell sites are in soft handoff, there is a calculation using the RTDs information from both cell sites by means of circular trilateration. For RTDs call history data information for more than three cells, circular trilateration is utilized by the position estimator 94 to estimate the position of the mobile user 12. For the instance where PSMM messages are used, a hyperbolic trilateration is used to locate the mobile user.

The output of the position estimator 94 is a rough or raw position estimation of the location of mobile user 14 in the network 10. This information is refined by a Kalman filter 95 which compares the new position estimate information with previous stored position estimates of information for the mobile user 14. As a result, the Kalman filter helps or alter the position estimate for the mobile user within the network.

Once the last record in a call log history has been processed by position estimator 94 and passed through the Kalman filter 95, then a reverse Kalman filter 97 re-evaluates all position estimates for that call in a reverse direction and revises the position estimates of the mobile user 14 within a repository database 97.

The position estimate information is then transmitted back via communication link 44 of FIG. 1 to the VLT processor 30. The VLT processor 30 then develops a mobile user position information data that represents a geographical position of the mobile user in the network. The VLT processor 30 in combination with the mobile user position locator 42 determines the longitudinal and latitudinal co-ordinates of a selected mobile. The VLT processor 30 and the mobile user position locator 42 collectively act as a mobile user positioning processor that is responsive to the selected mobile user information data, associated call history data and the access configuration information data to develop mobile user position information data that represents the geographical position of the mobile user in the network. While in one embodiment the VLT processor 30 receives mobile user position information from the mobile user position locator 42 and processes this information with the network database information 26, it should be understood that it may be possible for this entire processing function to occur in the mobile user position locator 42.

In any event, the mobile user position information data is next forwarded from VLT processor 30 via linked communication line 46 to the local repository database 48. The purpose of the local repository database 48 is to store all information that has been calculated by the processors 30 and 42 locally in the client system 28 so as to save storage space in call history database 24 and to improve performance.

In accordance with an aspect of the present invention, any mobile user position information data that relates to a dropped call is also forwarded back to a drop call database 50 located in the network 10. This dropped call information is either forwarded directly from the VLT processor 34 along link line 52 or alternatively may be forwarded by the local repository 48 to the drop call database 50. Due to the importance of the information related to drop calls to the efficiency of the operation of the network 10, the present invention stores the information in a call database 50 within the network. This allows other administrators to access and review this drop call information from the network 10 without having to go calculate position estimates for the mobile user position 14.

It should also be understood that the VLT processor 30 prior to computing any selected information from the call history database 24 to determine the mobile user position information data may also check along link line 46 to the local repository 48 and also the drop call database 50 along link line 52 to determine if the actual position information has already been developed. If so, this prevents any redundant processing by the client system 28.

The VLT processor 30 may also be accessed by the administrator of the client system 28 to view the data relating to the mobile user position information data of selected calls from the local repository. The VLT processor instructs the local repository to send selected call information to a mapping unit or map unit 54. The map unit displays selected criteria from the local repository 48 in many different configurations.

In one configuration, once a mobile path or the path of a mobile user within the network is calculated successfully it can become available for replay. The mobile path replay is selected by the administrator by setting the date and time range to obtain a list of only those calls which started within a specific time range and are stored in the local repository 48. Further, if a base station manager 16 is specified, then only those calls which took place in the area of the base station manager 16 are shown. The user may have an option to select multiple base station cell sites. In one embodiment the map unit 54 is able to display on a geographical map of the network the path of travel of a mobile user on a call in the network, the density of active calls by sectors in the network and/or the location of dropped calls in the network.

The mobile user position locator 42 utilizes the parsed data relating to the call history information associated with the mobile user 12 received from the call history database 22. The call history information data is in the form of SBS (System Base Station) logs. As stated above, the position locator 42 makes use of two types of records contained in the SBS logs; namely, Round Trip Delay records (RTD) and Neighbor List Tuning Data Array (NLTDA) records or PSMM messages.

The RTD record includes a measurement of the time taken for the signal to travel to the mobile user 12 from a base station tower of a cell site 14 and return to the cell site 14.

The call history information is provided to the position locator 42 in table format such as, for example, the format of Table 1 below.

The 14$^{th}$ column of Table 1 identifies the antenna as either an omni directional antenna or a sector directed antenna for a enhancer site.

TABLE 1

| Time (sec) | Measurement (bits) | Measurement type (rtd/psmm) | Cell site x-coord | Cell site y-coord | Site ID | Enhancer (yes/no) | Enhancer x-coord | Enhancer y-coord | Enhancer delay (bits) | Site Azimuth | Ec/Io (PSMM only) | GPS offset | Enhancer sector type (omni/ directionL) | Enhancer azimuth |
|---|---|---|---|---|---|---|---|---|---|---|---|---|---|---|
| 52101 | 10 | 2 | −2593 | −2408 | 227 | 1 | −1045 | −2723 | 13.23 | 130 | −15.5 | 0 | 1 | 90 |
| 52101 | 10 | 2 | 3039 | 1420 | 674 | 0 | 0 | 0 | 0 | 200 | −14.5 | 0 | 0 | 0 |
| 52101 | 6 | 2 | −2346 | 0 | 46 | 0 | 0 | 0 | 0 | 130 | −10 | 0 | 0 | 0 |
| 52101 | 0 | 2 | 0 | 0 | 110 | 0 | 0 | 0 | 0 | 130 | −8.5 | 0 | 0 | 0 |
| 52107 | 21.0 | 1 | 0 | 0 | 110 | 0 | 0 | 0 | 0 | 130 | 0 | 0 | 0 | 0 |
| 52107 | 30.7 | 1 | −2593 | −2408 | 227 | 1 | −1045 | −2723 | 13.23 | 130 | 0 | 0 | 1 | 90 |
| 52107 | 27.2 | 1 | 3039 | 1420 | 674 | 0 | 0 | 0 | 0 | 200 | 0 | 0 | 0 | 0 |
| 52107 | 27.0 | 1 | −2346 | 0 | 46 | 0 | 0 | 0 | 0 | 130 | 0 | 0 | 0 | 0 |

Table 1 contains in the 1$^{st}$ column from the left a time reference which relates to the time that the call SBS log is written. Each row in Table 1 contains one record of information. Redundant time reference records occur producing several records when the mobile user in soft handoff between adjacent cell sites 14 in the network 10. This is represented in the two redundant records shown in Table 1. In a circumstance where the mobile user is not in a soft handoff, it should be understood that one record from a single cell site will be stored in a row of the table.

The second column is a measurement of the RTD/PSMM delay. This measurement is reported in chips and not microseconds. This RTD measurements are converted to chips by multiplying the measurement in the RTD record by 1.2288.

The 3$^{rd}$ column indicates the type of measurement. The position locator 42 assumes that a Measurement type 1 in column 3 corresponds to an RTD record and a Measurement type 2 in column 3 corresponds to a PSMM in the Neighbor List Tuning Data Array record.

Table 1 contains the x-coordinate and y-coordinate of the location of the cell sites in the network in the 4$^{th}$ and 5$^{th}$ columns of the table from the left. The mobile user position locator 42 uses xy-coordinates, and not latitude/longitude values, for the cell site. The manner in which the x and y co-ordinates are converted to longitude/latitude values is described below. The 6$^{th}$ column is the cell site ID number assigned by the network.

The 7$^{th}$ to 10$^{th}$ columns of Table 1 contain repeater station or enhancer information Column 7 information indicates if a cell site has an enhancer mode by the numeral 1 and does not have an enhancer by number 0. The enhancer x and y co-ordinate modifications values are stored in columns 8 and 9. Also, the Enhancer delay in bits is stored in column 10. This delay includes the amount of time it takes the signal to travel between the enhancer and the cell site in one direction as well as the delay through the enhancer.

Column 11 in Table 1 records antenna azimuth of the cell site or the enhancer. The antenna azimuths of the cell sites and enhancers assume that 0 degrees points North and the azimuth increases in a clockwise direction.

The 12$^{th}$ column of Table 1 represents the relative signal strength of the pilot associated with the cell site sector. It is not used in the position location algorithm.

The 13$^{th}$ column of Table 1 represents GPS offset for the cell site. If there is any offset, it is reported in chips.

The 15$^{th}$ column of Table 1 represents the azimuth of a sector directed antenna for the enhancer site.

The mobile user position locator 42, and the VLT mobile user position locator 30 converts the latitude/longitude of each cell or enhancer location to xy-coordinates. A selected cell site is given the coordinates (0,0). All mobile positions and all other cell sites/enhancers are referenced to this cell site. In the Table 2 below, Cell Site ID 110 is chosen as the reference cell site and the other cell sites are given a reference location relative to the referenced cell site by providing delta x and y positions.

TABLE 2

| Cell ID | Cell Name | latitude | Longitude | delta x | Delta y |
|---|---|---|---|---|---|
| W0110 | QEB, 70 | 43.62222222 | −79.51 | 0 | 0 |
| W0046 | North Queen | 43.62222222 | −79.5392 | −2346.64 | 0 |
| W0227 | Browns Line | 43.60055556 | −79.5422 | −2592.94 | −2408.08 |
| W0674 | South Kingsway/ Queensway | 43.635 | −79.4722 | 3039.132 | 1420.148 |

The method associated with the operation of the mobile user position locator 42 is described with reference to the flow chart found in FIGS. 3A through 3F.

Figure 3A:
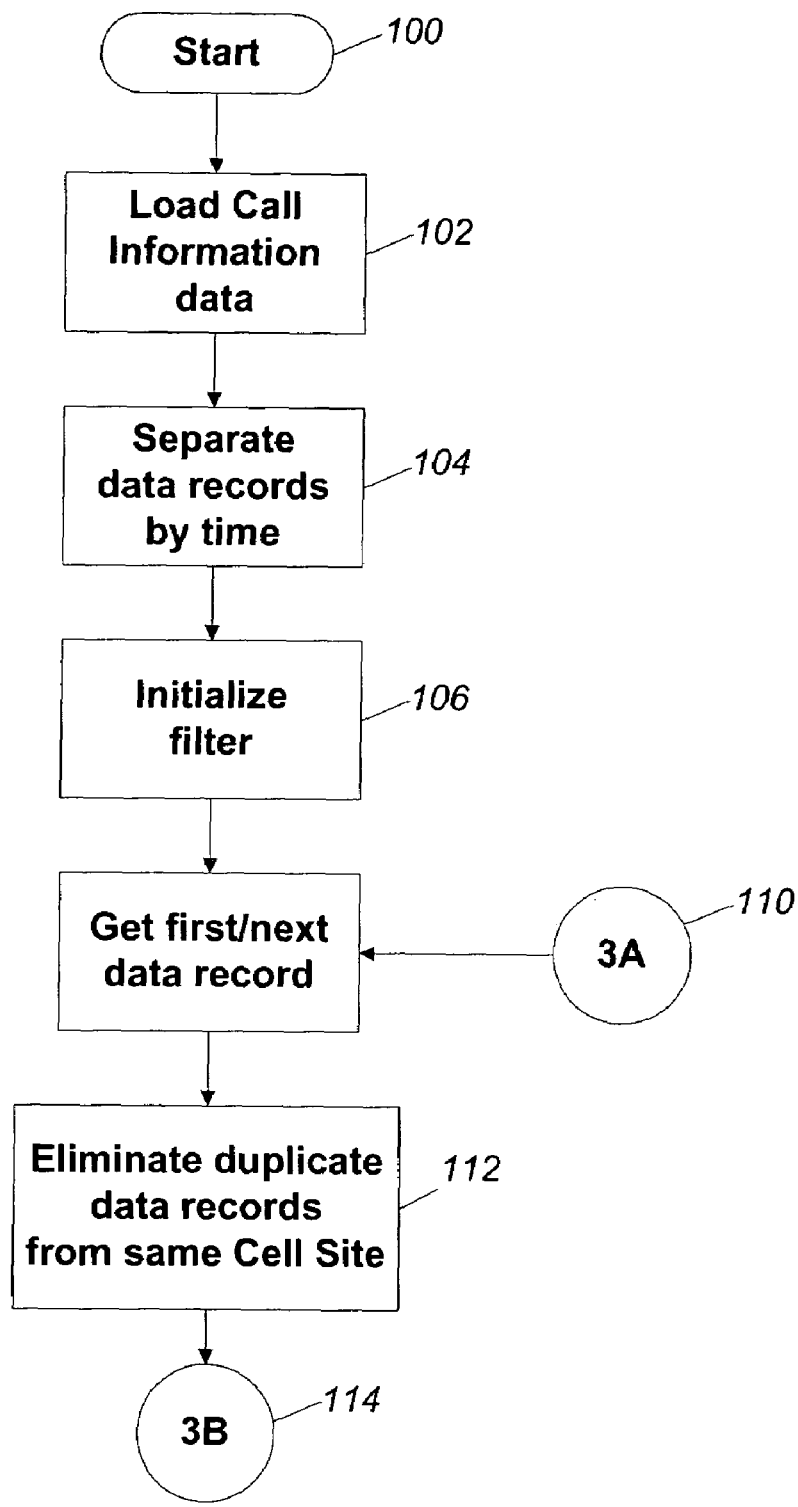
FIGS. 3A to 3F are a flow chart of the operation of the present invention.
Figure 3B:
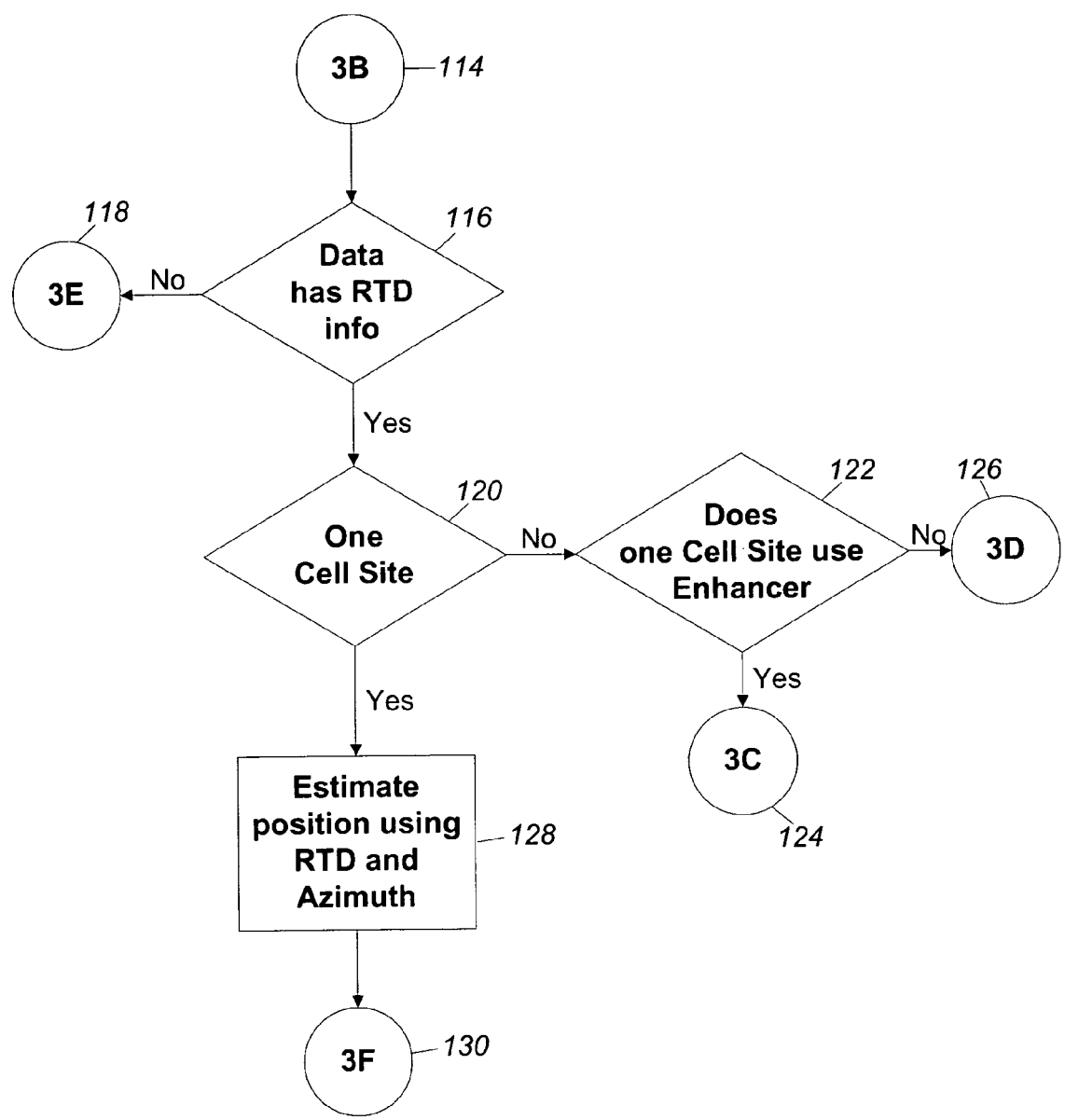

In FIG. 3A the mobile user position locator 42 starts at 100. Thereafter the mobile user position locator 42 loads call information data at 102. This call information data corresponds to the data noted in table 1 above. The mobile user position locator 42 then separates the data records by time at 104. The mobile user position locator 42 also initiates a filter at 106. The filter employed by the present invention is a Kalman filter. The mobile user position locator 42 subsequently gets the first or the next data record at 108. The filter eliminates duplicate data records that are from the same cell site at 112. The program flow chart from FIG. 3A connects at 114 to the programmed flow chart in FIG. 3B. The mobile user position locator 42 interrogates whether or not the data contains RTD information at 116. In the event that the data contains this RTD information, the mobile user position locator 42 determines if there is data from one or more cell sites at 120. If there is only data from one cell site, a position estimate is calculated by the mobile user position locator 42 at 128 and the output sent to connecting terminal 130. The position estimate is used utilizing the RTD information and the Azimuth information of the cell site. A more detailed explanation of the algorithm involving this calculation is described herein below.

In the event that there are more than one cell sites determined at processing step 120, the mobile user position locator 42 determines at site 122 if at least one of the multiple cell site records uses an enhancer at 122. In the event that there is an enhancer in use than the program mobile user position locator 42 moves out through terminal 126. In the event that there is no enhancer in use than the mobile user position locator 42 connects through terminal 124. Lastly, if there is no RTD data information in the record as determined by the record as determined at step 116, the mobile user position locator 42 connects to terminal 118.

Figure 3C:
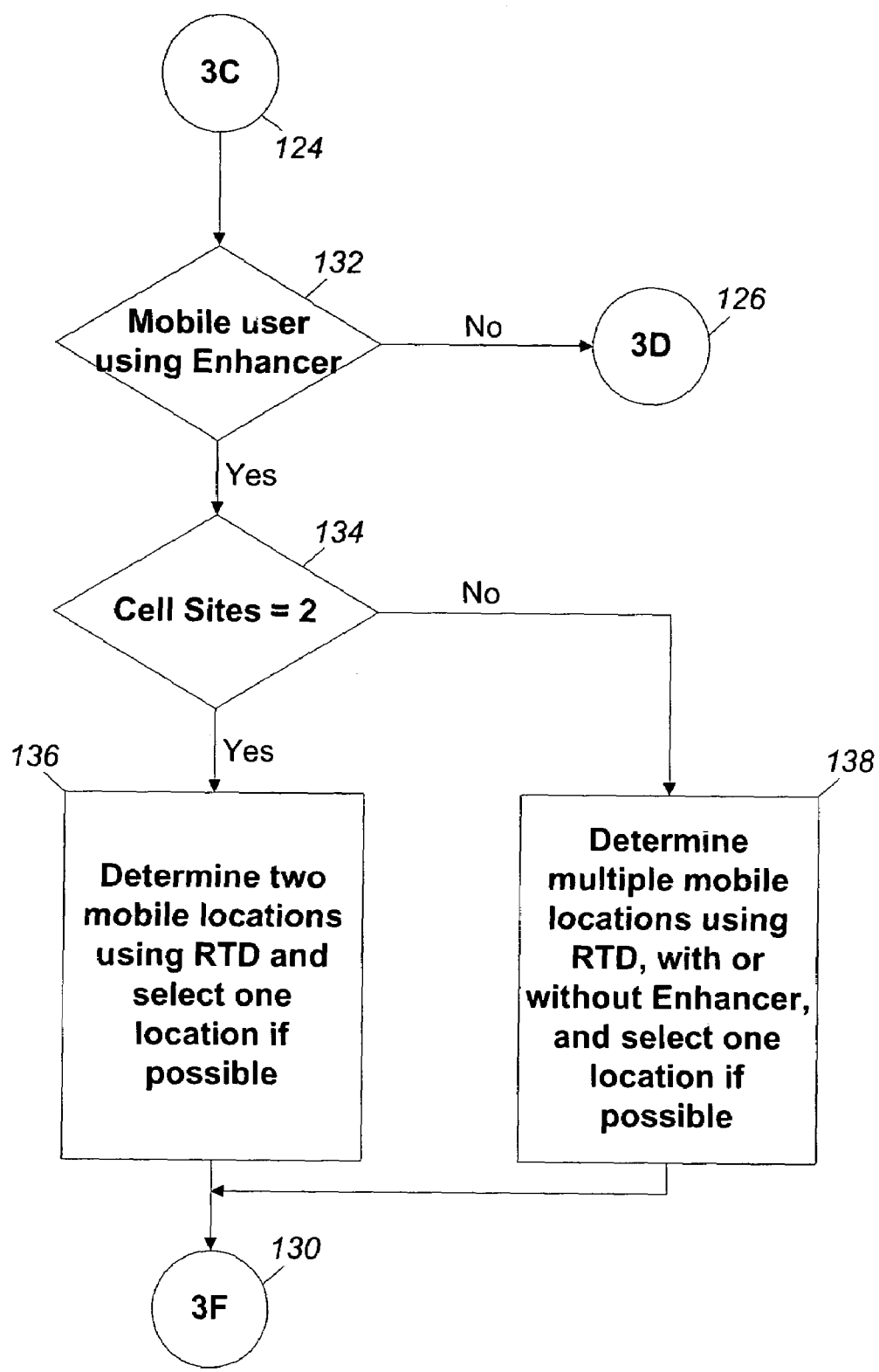

Referring to FIG. 3C, the flow chart begins on this figure with step 124 which corresponds to the instance where the mobile user position locator 42 has determined that there is more than one cell site and one of the cell sites is using an enhancer. The mobile user position locator 42 then determines at 132 if a mobile user is using an enhancer. If the answer is no then the program connects at terminal 126. If in fact the mobile user is using an enhancer at 132 than the program continues to step 134. The manner in which the program or mobile user position locator 42 determines if there is an enhancer in use by either the cell site or the mobile user is described in more detail herein below.

The program at step 134 then determines if there are only two cell sites in use. If there is two cell sites in use then the mobile user position locator 42 136 determines two mobile locations using the RTD information if it is known whether or not an enhancer is in use and then selects one location if possible. A more detailed description of the algorithm which selects one of the 2 possible locations is explained in more detail hereinafter. In the event that there are more than two cell sites in use at 134, then at step 138 the mobile user position locator 42 determines the multiple mobile locations using RTD and with or without the enhancer information and selects one position if possible. It should be understood that enhancers may be used in one of the cell sites and not all of the cell sites and accordingly where enhanced information is available will be used otherwise the raw information will be used. The output of step 134 is again to terminal 130.

Figure 3D:
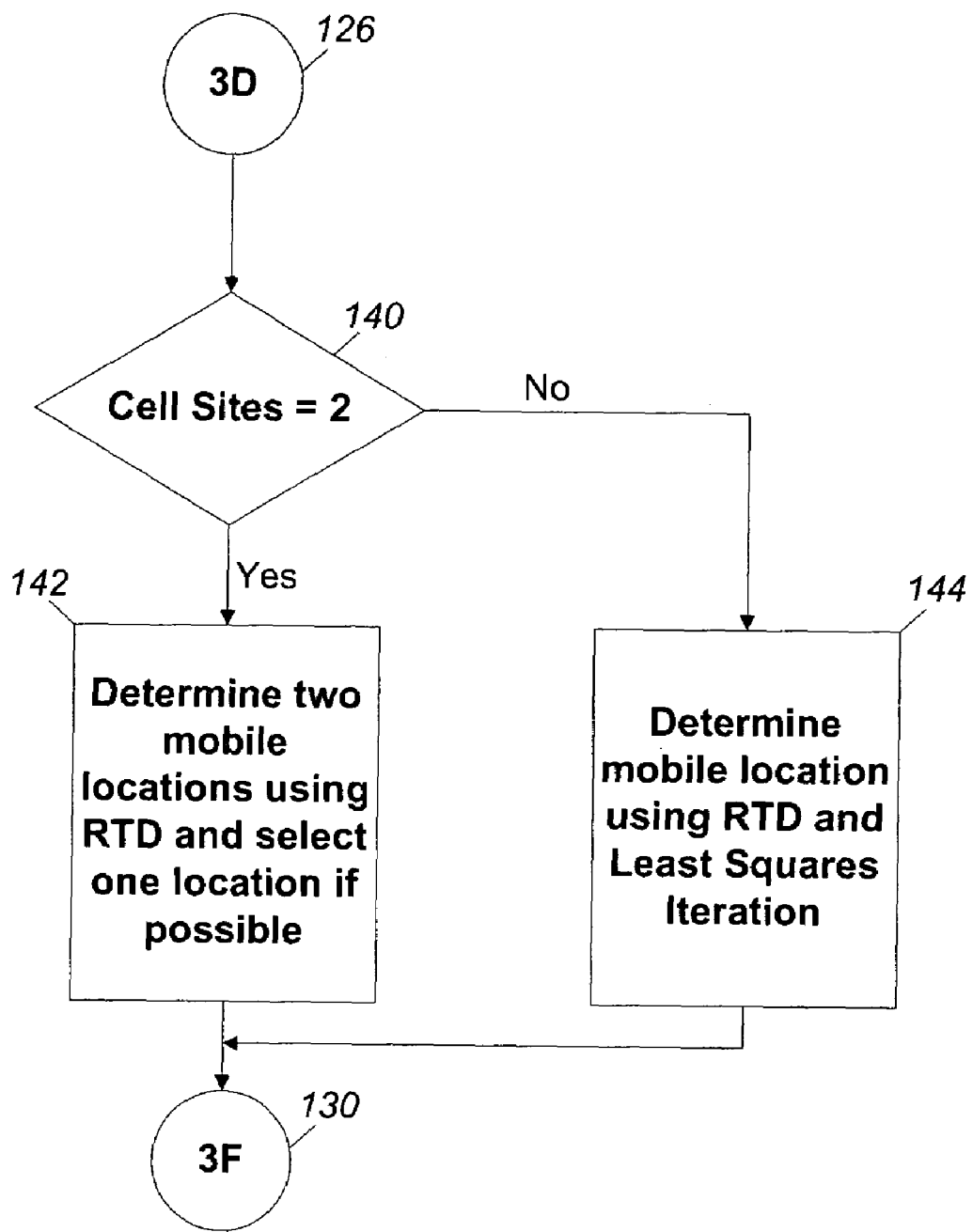

Referring to FIG. 3D, this portion for the flow chart begins with terminal connection 126. At this point in the processing, the mobile user position locator 42 has determined that there are more than one cell sites reporting a position location on the mobile user, that none of these cell sites use an enhancer. Next, the mobile user position locator 42 determines whether or not there are two cells in place or there are more than two cells reporting a location for the mobile user. In the event that there are only two cells locating a position for the mobile user, then at step 142 the mobile user position locator 42 determines the two mobile locations using RTD and Azimuth information and selects one location if possible. In the event that there are three or more cells reporting positions for the mobile user in this one time record, the mobile user position locator 42 determines the mobile location using RTD for each of the cell sites and calculates the mobile's location if possible. The location information at step 144 is sent to connecting terminal 130.

Figure 3E:
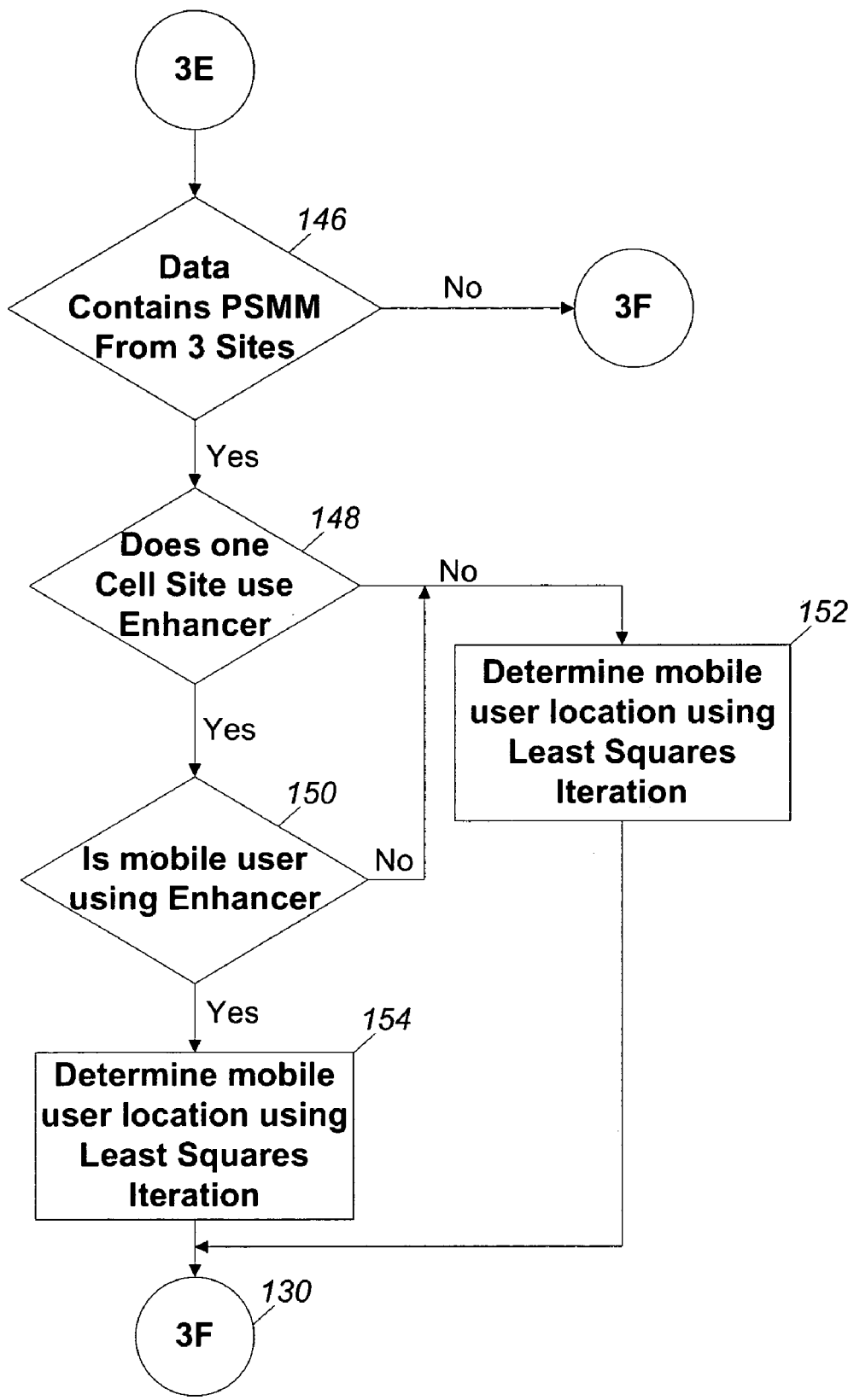

Referring to FIG. 3E, the connecting terminal 118 at the beginning of this flow chart has determined that there is no RTD information associated with the SBS record. This means that the data contained in the SBS record contains PSMM records from at least three sites. The mobile user position locator 42 than at step 146 determines if the PSMM data is coming from at least three sites. In the event that it is from two sites or less, the mobile user position locator 42 moves in the flow chart to connecting terminal 130. Should the data at step 146 contain PSMM data from at least three sites then at step 148 the mobile user position locator 42 determines if one cell site is using an enhancer. If the answer is yes, then the mobile user position locator 42 determines if the mobile user is using an enhancer at 150. If none of the cell sites is using an enhancer, then the mobile user position locator 42 moves into step 152 to determine the mobile user location using RTD information.

In step 150, the algorithm tries to determine if the mobile is using an enhancer. In the event that the mobile user is using an enhancer then at step 154 the mobile user position locator 42 determines using the RTD and Azimuth information as well as the neural network information the location with or without enhancer information the location of the mobile user. The information or the determination from steps 152 and 154 are next conveyed in the flow chart through connecting terminal 130.

Figure 3F:
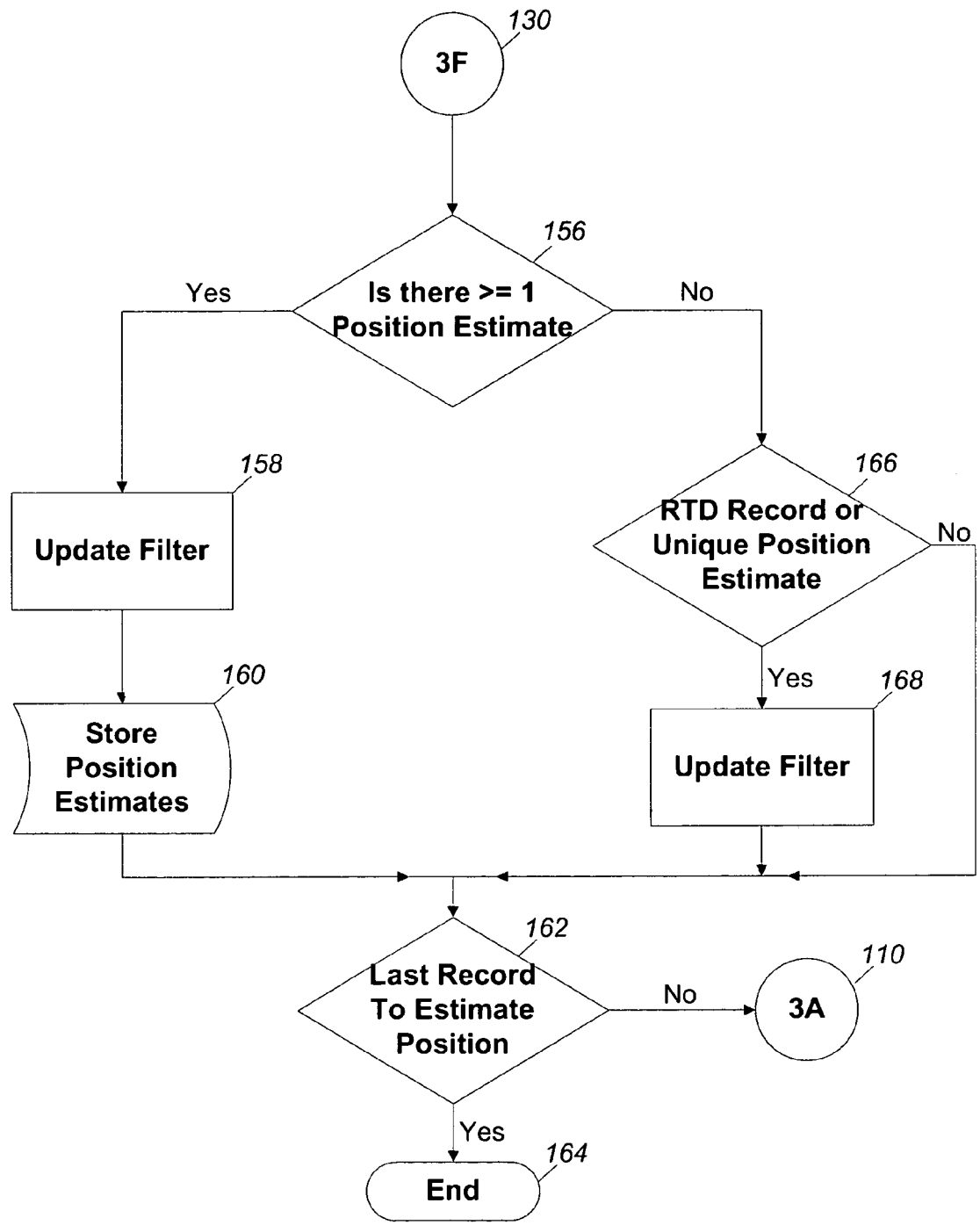

Referring now to FIG. 3F, the connecting terminal 130 represents some information having been processed in the flow chart or by the mobile user position locator 42 up to this time whereby at least one position estimate of the location of the mobile user has been determined. The first step in this portion of the flow chart is for the mobile user position locator 42 at step 156 to determine if there is more than one position estimate. If there is less than 2 position estimates, the mobile user position locator 42 then at step 166 determines if this record is an RTD record or if there is a valid unique position estimate. If it is an RTD record or there is a valid unique position estimate, then the Kalman filter is updated with this information. If there is no unique position estimate and the record is not an RTD record, then the filter is not updated. The negative output of step 166 and the output of step 168 is then sent to step 162 wherein the question is asked if this is the last record. If it is the last record then the program ends at steps 164. If it is not the last record then the mobile user position locator 42 loops back at terminal 110 to FIG. 3A at step 108 in the flow chart and obtains the next data record.

In the event that there is more than one position estimate at step 156, then the filter is updated at 158 by the mobile user position locator 42 and the position estimates are stored at 160. After the positions are stored at 160, the mobile user position locator 42 will determine if this is the last record to estimate at 162 and if it is not returned in a loop to FIG. 3A at the connection terminal 110. If it is the last estimate then it will end the program at 164.

It should be understood that the mobile user position locator 42 in ending at this step 164 is in effect ending a processing loop the information regarding the position by the mobile user position locator 42 at this time may be further refined by utilizing a Rauch-Tung-Striebel Smoother to improve the position estimate.

There are two kinds of logs that are collected that can be used for position location purposes: Round Trip Delay (RTD) and Neighbor List Tuning Data Array NLTD. For the scenario in which the mobile user is not in soft handoff, the antenna azimuth is used as well as the RTD data to determine the position of the mobile user. For the scenario in which the mobile user is in soft handoff with two cell sites, additional information is required to locate the user since that are two possible answers. Only RTD data is used when the mobile users is in soft handoff with two cell sites. When the mobile user is in soft handoff with at least three cell sites, either the Neighbor List Tuning Data Array record or the RTD record can be used for position location.

At step 128 in the process, the mobile user position locator 42 for to calculate the mobile user's position, the mobile user's distance from the cell site is estimated first. As required by IS-95, the mobile sets the first arriving pilot used for demodulation as a time reference and is required to align its uplink transmissions to within 1 microsecond of this time reference, except when the reference pilot changes. The distance $L_1$ between the mobile and the cell site can be estimated by dividing the RTD by 2 and multiplying the result by the speed of light, i.e.

$$L_1 = RTD \times c/2$$

$$c = 299.7925 \text{ m}/\mu s$$

If the mobile user is in 2-way softer handoff, the mobile user position locator 42 at step 142 uses the smaller of the RTD measurements from the mobile user to each cell site. The azimuth used is the average azimuth of the two sectors.

At step 136 the mobile user position locator is determining the position of the mobile user 12 in the network 10 in the scenario where there are RTD records and the mobile user 12 in a two cell soft handoff. To calculate the mobile user's position, the mobile user's distance from each cell site is estimated first. As required by IS-95, the mobile sets the first arriving pilot used for demodulation as a time reference and is required to align its uplink transmissions to within 1 microsecond of this time reference, except when the reference pilot changes. In general, the reference pilot is associated with the cell site with the smallest round trip delay measurement. If the reference pilot is not associated with the cell site with the smallest round trip delay measurement, it is best to ignore that particular RTD record.

The distance between the mobile and the cell site with the smallest RTD measurement can be estimated by dividing the RTD by 2 and multiplying the result by the speed of light, i.e.

$$L_1 = RTD_{closest} \times c/2$$

$$c = 299.7925 \text{ m}/\mu s$$

The mobile user position locator 42 assumes that the measurement are in chips and not microseconds, hence the formula is:

$$L_1 = RTD_{closest} \times \text{chip}/2$$

$$\text{chip} = 243.97 \text{ m}$$

The formula used to estimate the distance to the further cell site has a slightly different form where $L_2$ is the distance from the second cell site.

$$L_2 = RTD_{further} \times \text{chip} - L_1$$

$$L_2 = RTD_{further} \times \text{chip} - (RTD_{closest}/2) \times \text{chip}$$

In a two cell soft handoff scenario, there are two possible solutions $(x_{m1}, y_{m1})$ and $(x_{m2}, y_{m2})$ (which represent two x and y mobile users co-ordinates in the network). The coordinates of the two base stations are $(x_1, y_1)$ and $(x_2, y_2)$. The location of the two mobile user co-ordinates is determined from the following formulae:

$$x_{m1} = x_1 + \frac{\alpha}{L_B}(x_2 - x_1) + \sqrt{L_1^2 - \alpha^2}\,(y_2 - y_1)/L_B$$

$$y_{m1} = y_1 + \frac{\alpha}{L_B}(y_2 - y_1) + \sqrt{L_1^2 - \alpha^2}\,(x_1 - x_2)/L_B$$

-continued $$x_{m2} = x_1 + \frac{\alpha}{L_B}(x_2 - x_1) + \sqrt{L_1^2 - \alpha^2}\,(y_1 - y_2)/L_B$$

$$y_{m2} = y_1 + \frac{\alpha}{L_B}(y_2 - y_1) + \sqrt{L_1^2 - \alpha^2}\,(x_2 - x_1)/L_B$$

$$L_B = \sqrt{(x_2 - x_1)^2 + (y_2 - y_1)^2}$$

$$\alpha = (L_1^2 - L_2^2 + L_B^2)/(2 \cdot L_B)$$

Once the two possible coordinates of the mobile user 12 are chosen, additional methods is used to select which of the two coordinates that the mobile actually resides. The mobile user position locator 42 uses the extrapolated state estimate $x^-$ and the extrapolated error covariance matrix $P^-$ of the Kalman filter in determining which of the two coordinates are correct. The correct solution is the position that is closest to the extrapolated state estimate and within 5 standard deviations of the average position error as determined by the extrapolated error covariance matrix.

Once the location of the mobile has been determined, the error covariance matrix $R_{2way\_RTD}$ for that location is calculated as follows for its use in the Kalman filter.

$$H = \begin{bmatrix} -\frac{(x_1 - x_m)}{r_1} & -\frac{(y_1 - y_m)}{r_1} \\ -\frac{(x_2 - x_m)}{r_2} & -\frac{(y_2 - y_m)}{r_2} \end{bmatrix}$$

$$r_1 = \sqrt{(x_1 - x_m)^2 + (y_1 - y_m)^2}$$

$$r_2 = \sqrt{(x_2 - x_m)^2 + (y_2 - y_m)^2}$$

$$R = \begin{bmatrix} R_1 & 0 \\ 0 & R_2 \end{bmatrix}$$

$$R_1 = R_2 = (3 \cdot \text{bit\_dist})^2 / 12$$

$$\text{bit\_dist} = c/1228800$$

$$c = 299.7925 \times 10^6 \text{ m/s}$$

$$\text{bit\_dist} = 243.97 \text{ m}$$

$$R_{2way\_RTD} = (H^T R^{-1} H)^{-1}$$

where H is the observation matrix, $R_1$ and $R_2$ is the variance associated with each RTD measurement, R is the variance matrix, c is the speed of light and bit_dist is distance traveled by electromagnetic radiation during one bit period.

It should be understood that if one of the cell sites has a GPS offset, no calculations are performed. It has been determined that the GPS offset would cause the mobile user's clock to slew in an erratic manner, hence making it impossible to predict the behavior of the mobile user's clock.

At step 144 in the flow chart, the mobile user position locator 42 is determining the position of the mobile user 12 having an RTD record and being in a three or more cell soft handoff. A recursive algorithm is used to determine the location of the mobile in a situation where the mobile is in soft handoff with three different cell sites. This method requires that an initial estimate of the position of the mobile be established. They are two methods that are used to determine the initial position because convergence of the iterative least squares algorithm is dependent on the selection of the initial mobile position. First the extrapolated state estimate x⁻ is used as the initial mobile user position. If convergence is not obtained, then the midpoint between all cell sites is used as the initial position.

It may be convenient to convert the RTD measurements from microseconds or chips to meters where $S_i$ is the alternate expression of the RTD measurement expressed in meters.

$$S_i = RTD_i \times c = RTD_i \times 299.7925 \text{ μs/m}$$

$$S_i = RTD_i \times \text{chips} = RTD_i \times 243.97 \text{ m}$$

It should be understood to not divide the RTD measurements by 2, because $S_1$, $S_2$, and $S_3$ do not represent the mobile user's distance from the cell sites. Before the algorithm is started, the amount of time that the mobile user's clock lags the cell site clock is estimated. The best estimate for the clock lag is approximately half the RTD associated with the closest cell site. It is also convenient to convert the clock lag to meters. The algorithm utilizes the following matrices:

$$H = \begin{bmatrix} \frac{(x_1-x_m)}{r_1} & \frac{(y_1-y_m)}{r_1} & -1 \\ \frac{(x_2-x_m)}{r_2} & \frac{(y_2-y_m)}{r_2} & -1 \\ \frac{(x_3-x_m)}{r_3} & \frac{(y_3-y_m)}{r_3} & -1 \end{bmatrix}$$

$$r_i = \sqrt{(x_i-x_m)^2 + (y_i-y_m)^2}$$

$$z = \begin{bmatrix} r_1+b-S_1 \\ r_2+b-S_2 \\ r_3+b-S_3 \end{bmatrix}$$

Where $(x_m, y_m)$ is the coordinates of the mobile, $(x_i, y_i)$ i=1,2,3 are the coordinates of the cell sites, b is the clock bias of the mobile converted to meters, $r_i$ is the distance between the mobile location and the $i^{th}$ cell site, H is the observation matrix, z is the error vector, and $S_i$ i=1,2,3 is the RTD measurements converted to meters.

Now, the following algorithm is used to estimate the mobile user's location.

$$\Delta X = \begin{bmatrix} \Delta x \\ \Delta y \\ \Delta b \end{bmatrix} = (H^T H) H^T z,$$

$$x_{new} = x_m + \Delta x$$

$$y_{new} = y_m + \Delta y$$

$$b_{new} = b + \Delta b$$

where H is the observation matrix, z is the error vector, ΔX is the update vector applied to the mobile's coordinates and clock bias $(x_m, y_m, b)$, and $x_{new}, y_{new}, b_{new}$ are the updated coordinates and bias of the mobile.

We now have the new estimate of the mobile user's location. To get a better estimate, the same algorithm is repeated using the new position estimate, i.e.:

$$x_m = x_{new}, y_m = y_{new}, b = b_{new}$$

$$H = \begin{bmatrix} \frac{(x_1-x_m)}{r_1} & \frac{(y_1-y_m)}{r_1} & -1 \\ \frac{(x_2-x_m)}{r_2} & \frac{(y_2-x_m)}{r_2} & -1 \\ \frac{(x_3-x_m)}{r_3} & \frac{(y_3-x_m)}{r_3} & -1 \end{bmatrix}$$

$$z = \begin{bmatrix} r_1+b-S_1 \\ r_2+b-S_2 \\ r_3+b-S_3 \end{bmatrix}$$

$$\Delta X = \begin{bmatrix} \Delta x \\ \Delta y \\ \Delta b \end{bmatrix} = (H^T H) H^T z,$$

$$x_{new} = x_m + \Delta x$$

$$y_{new} = y_m + \Delta y$$

$$b_{new} = b + \Delta b$$

where H is the observation matrix, z is the error vector, ΔX is the update vector applied to the mobile's coordinates and clock bias $(x_m, y_m, b)$, and $x_{new}, y_{new}, b_{new}$ are the updated coordinates and bias of the mobile.

The algorithm is repeated until Δx, Δy, and Δb is very small, for example, <0.1 m.

Once the location of the mobile has been determined, the error covariance matrix $R_{3way\_RTD}$ for that location is calculated for its use in the Kalman filter.

$$H = \begin{bmatrix} \frac{(x_1-x_m)}{r_1} & \frac{(y_1-y_m)}{r_1} & -1 \\ \frac{(x_2-x_m)}{r_2} & \frac{(y_2-x_m)}{r_2} & -1 \\ \frac{(x_3-x_m)}{r_3} & \frac{(y_3-x_m)}{r_3} & -1 \end{bmatrix}$$

$$r_1 = \sqrt{(x_1-x_m)^2 + (y_1-y_m)^2}$$

$$r_2 = \sqrt{(x_2-x_m)^2 + (y_2-y_m)^2}$$

$$r_3 = \sqrt{(x_3-x_m)^2 + (y_3-y_m)^2}$$

$$R = \begin{bmatrix} R_1 & 0 & 0 \\ 0 & R_2 & 0 \\ 0 & 0 & R_3 \end{bmatrix}$$

$$R_1 = R_2 = R_3 = (3 \cdot \text{bit\_dist})^2 / 12$$

$$\text{bit\_dist} = c / 1228800$$

$$c = 299.7925 \times 10^6 \text{ m/s}$$

$$\text{bit\_dist} = 243.97 \text{ m}$$

$$R_{3way\_RTD} = (H^T R^{-1} H)^{-1}$$

where H is the observation matrix, $R_1$, $R_2$ and $R_3$ is the variance associated with each RTD measurement, R is the variance matrix, c is the speed of light and bit_dist is distance traveled by electromagnetic radiation during one bit period.

The mobile user position locator 42 performs the least squares algorithm. It uses the initial position pass to it by the calling mobile user position locator 42 unless the initial position is (0,0) in which case it uses the midpoint between all the cell sites.

Calculating the mobile user's position in a 4 cell site handoff scenario is nearly identical to the 3 handoff case and is determined at step 144 in the flow chart.

$$H = \begin{bmatrix} \frac{(x_1 - x_m)}{r_1} & \frac{(y_1 - y_m)}{r_1} & -1 \\ \frac{(x_2 - x_m)}{r_2} & \frac{(y_2 - x_m)}{r_2} & -1 \\ \frac{(x_3 - x_m)}{r_3} & \frac{(y_3 - x_m)}{r_3} & -1 \\ \frac{(x_4 - x_m)}{r_4} & \frac{(y_4 - x_m)}{r_4} & -1 \end{bmatrix}$$

$$z = \begin{bmatrix} r_1 + b - S_1 \\ r_2 + b - S_2 \\ r_3 + b - S_3 \\ r_4 + b - S_4 \end{bmatrix}$$

$$\Delta X = \begin{bmatrix} \Delta x \\ \Delta y \\ \Delta b \end{bmatrix} = (H^T H)^{-1} H^T z,$$

where $(x_m, y_m)$ is the coordinates of the mobile, $(x_i, y_i)$ i=1,2,3,4 are the coordinates of the cell sites, b is the clock bias of the mobile converted to meters, $r_i$ is the distance between the mobile location and the $i^{th}$ cell site, H is the observation matrix, z is the error vector, $\Delta X$ is the update vector applied to the mobile's coordinates and clock bias and $S_i$ i=1,2,3,4 is the RTD measurements converted to meters.

Everything else remains the same as the 3 cell site scenario.

Once the location of the mobile has been determined, the error covariance matrix $R_{4way\_RTD}$ for that location is calculated for its use in the Kalman filter.

$$H = \begin{bmatrix} \frac{(x_1 - x_m)}{r_1} & \frac{(y_1 - y_m)}{r_1} & -1 \\ \frac{(x_2 - x_m)}{r_2} & \frac{(y_2 - x_m)}{r_2} & -1 \\ \frac{(x_3 - x_m)}{r_3} & \frac{(y_3 - x_m)}{r_3} & -1 \\ \frac{(x_4 - x_m)}{r_4} & \frac{(y_4 - x_m)}{r_4} & -1 \end{bmatrix}$$

$$r_1 = \sqrt{(x_1 - x_m)^2 + (y_1 - y_m)^2}$$
$$r_2 = \sqrt{(x_2 - x_m)^2 + (y_2 - y_m)^2}$$
$$r_3 = \sqrt{(x_3 - x_m)^2 + (y_3 - y_m)^2}$$
$$r_4 = \sqrt{(x_4 - x_m)^2 + (y_4 - y_m)^2}$$

$$R = \begin{bmatrix} R_1 & 0 & 0 & 0 \\ 0 & R_2 & 0 & 0 \\ 0 & 0 & R_3 & 0 \\ 0 & 0 & 0 & R_4 \end{bmatrix}$$

$$R_1 = R_2 = R_3 = R_4 = (3 \cdot bit\_dist)^2 / 12$$

$$bit\_dist = c / 1228800$$

$$c = 299.7925 \times 10^6 \text{ m/s}$$

$$bit\_dist = 243.97 \text{ m}$$

$$R_{4way\_RTD} = (H^T R^{-1} H)^{-1}$$

where H is the observation matrix, $R_1$, $R_2$, $R_3$ and $R_4$ is the variance associated with each RTD measurement, R is the variance matrix, c is the speed of light and bit_dist is distance traveled by electromagnetic radiation during one bit period.

In a similar manner, the mobile user position locator 42 determines the soft cell handoff for 5 cell sites.

At step 146, the determination of the location of the mobile user 12 is determined by the mobile home position locator 42 by a Neighbor Tuning Data Array record. The SBS log is configured to include the Neighbor List Tuning Data Array record. An example of such a record is shown below in Table 3.

TABLE 3

| Ext'dBaseId | PowerCombineBit | PilotStrength | PNOffset | PNPhase |
|---|---|---|---|---|
| 0x095e12f2 | 1 | 10 | 0x0158 | 0x0000 |
| 0x095e0a51 | 1 | 35 | 0x0010 | 0x03fd |
| 0x095e0a53 | 0 | 43 | 0x0018 | 0x05fd |
| 0x095e0982 | 1 | 33 | 0x005c | 0x1701 |
| 0x095e12f1 | 1 | 33 | 0x0154 | 0x5500 |

PilotStrength is basically the absolute value of the Ec/Io which is multiplied by 2. The reference pilot is the one associated with the first Ext'dBaseId (i.e. 0x095e12f2 in the example). TheExt'dBaseID is a relative location of a base station neighbor cell to the main reference base station. The arrival of all other pilots is timed based on this reference pilot. The amount of delay between the reference pilot and the other pilots can be calculated by subtracting the expected PNPhase from the reported PNPhase. The expected PNPhase is calculated by multiplying the PNOffset by 64. For example, if the PNOffset is 0x005c, then the expected PNPhase should be 0x1700. In the example the reported PNPhase is 0x1701, hence the amount of delay is 1 chip.

To calculate the position of the mobile user 12, the mobile user is in soft handoff with at least three different cell sites. If the Tuning Data Array Record meets this criteria, an algorithm is used to determine the location of the mobile which is nearly identical to the algorithm used to calculate the position of the mobile using RTD (that is the method of least squares). For example, if the mobile were in a 4 cell site soft hand off scenario, the following matrices would be used.

$$H = \begin{bmatrix} \frac{(x_m - x_2)}{r_2} - \frac{(x_m - x_1)}{r_1} & \frac{(y_m - y_2)}{r_2} - \frac{(y_m - y_1)}{r_1} \\ \frac{(x_m - x_3)}{r_3} - \frac{(x_m - x_1)}{r_1} & \frac{(y_m - y_3)}{r_3} - \frac{(y_m - y_1)}{r_1} \\ \frac{(x_m - x_4)}{r_4} - \frac{(x_m - x_1)}{r_1} & \frac{(y_m - y_4)}{r_4} - \frac{(y_m - y_1)}{r_1} \end{bmatrix}$$

$$z = \begin{bmatrix} \delta_2 - (r_2 - r_1) \\ \delta_3 - (r_3 - r_1) \\ \delta_4 - (r_4 - r_1) \end{bmatrix}$$

where $\delta_2$ is the delay between the second pilot and the reference pilot converted to meters, $(x_m, y_m)$ is the coordinates of the mobile, $(x_i, y_i)$ i=1,2,3,4 are the coordinates of the cell sites, b is the clock bias of the mobile converted to meters, $r_i$ is the distance between the mobile location and the $i^{th}$ cell site, H is the observation matrix, and z is the error vector.

For example, if the delay is calculated to be 1 chip, then $67_2$ would equal 243.97 m. If the mobile is in a 3 cell scenario then use:

$$\Delta X = \begin{bmatrix} \Delta x \\ \Delta y \end{bmatrix} = H^{-1} z,$$

Else if H is not square use:

$$\Delta X = \begin{bmatrix} \Delta x \\ \Delta y \end{bmatrix} = (H^T W^{-1} H)^{-1} H^T W^{-1} z,$$

$$W = JJ^T$$

For a 3 cell site scenario:

$$J = \begin{bmatrix} -1 & 1 & 0 \\ -1 & 0 & 1 \end{bmatrix}$$

For a 4 cell site scenario:

$$J = \begin{bmatrix} -1 & 1 & 0 & 0 \\ -1 & 0 & 1 & 0 \\ -1 & 0 & 0 & 1 \end{bmatrix}$$

For a 5 cell site scenario:

$$J = \begin{bmatrix} -1 & 1 & 0 & 0 & 0 \\ -1 & 0 & 1 & 0 & 0 \\ -1 & 0 & 0 & 1 & 0 \\ -1 & 0 & 0 & 0 & 1 \end{bmatrix}$$

where $\Delta X$ is the update vector applied to the mobile's coordinates, W is the weighting matrix, H is the observation matrix, J is the transformation of variables matrix and z is the error vector.

As with the case of RTD, the error covariance matrix is calculated. For example, in a 4 cell site scenario:

$$H = \begin{bmatrix} \frac{(x_1 - x_m)}{r_1} & \frac{(y_1 - y_m)}{r_1} & -1 \\ \frac{(x_2 - x_m)}{r_2} & \frac{(y_2 - x_m)}{r_2} & -1 \\ \frac{(x_3 - x_m)}{r_3} & \frac{(y_3 - x_m)}{r_3} & -1 \\ \frac{(x_4 - x_m)}{r_4} & \frac{(y_4 - x_m)}{r_4} & -1 \end{bmatrix}$$

$$r_1 = \sqrt{(x_1 - x_m)^2 + (y_1 - y_m)^2}$$

-continued $$r_2 = \sqrt{(x_2 - x_m)^2 + (y_2 - y_m)^2}$$

$$r_3 = \sqrt{(x_3 - x_m)^2 + (y_3 - y_m)^2}$$

$$r_4 = \sqrt{(x_4 - x_m)^2 + (y_4 - y_m)^2}$$

$$R = \begin{bmatrix} R_1 & 0 & 0 & 0 \\ 0 & R_2 & 0 & 0 \\ 0 & 0 & R_3 & 0 \\ 0 & 0 & 0 & R_4 \end{bmatrix}$$

$$R_1 = R_2 = R_3 = R_4 = (2 \cdot \text{bit\_dist})^2 / 12$$

$$\text{bit\_dist} = c / 1228800$$

$$c = 299.7925 \times 10^6 \text{ m/s}$$

$$\text{bit\_dist} = 243.97 \text{ m}$$

$$R_{4\text{way\_TDA}} = (H^T R^{-1} H)^{-1}$$

where $(x_m, y_m)$ is the coordinates of the mobile, $(x_i, y_i)$ i=1,2,3,4 are the coordinates of the cell sites, $r_i$ is the distance between the mobile location and the $i^{th}$ cell site, H is the observation matrix, $R_1$, $R_2$, $R_3$ and $R_4$ is the variance associated with each RTD measurement, R is the variance matrix, c is the speed of light and bit_dist is distance traveled by electromagnetic radiation during one bit period.

The mobile user position locator 42 performs the least squares algorithm as described above. It uses the initial position pass to it by the calling mobile user position locator 42 unless the initial position is (0,0) in which case it uses the midpoint between all the cell sites.

In one embodiment, the first mobile position is calculated when RTD measurements are available from at least three different cell sites, a Tuning Data Array record containing PNPhase information from at least three cell sites, or an RTD measurement from a single cell site along with the azimuth.

When the mobile user position locator 42 determines at decsion network 93 that the mobile is receiving a signal from a cell enhancer (relevant for NTLA) as at step 154, or the signal the mobile user 12 is transmitting is being amplified by a cell enhancer (relevant for RTD) as at steps 136 and 138, certain adjustments are made before calculating the raw mobile position at steps 152, 136 and 138 in the position estimator 94. In both cases, the enhancer measurement that was recorded by the cell site or mobile user is reduced by an amount equal to the one way delay through the enhancer plus the one way transmission time between the donor cell site and the enhancer. Also, the cell site coordinates are changed to the coordinates of the enhancer.

Before calculating the raw position estimate of the mobile user, it is determined whether or not the mobile user's signal is being enhanced (in the case of RTD measurements) or if the mobile is receiving an enhanced signal (in the case of NLTA records). Making this judgement is not a simple as determining whether the RTD measurement exceeds a certain threshold. However if the RTD measurement does not exceed the one way enhancer delay plus the transmission time between the donor cell site and enhancer location, it is reasonably certain that an enhancer is not being used.

There is no similar rule that can be used in determining whether the mobile is receiving an enhanced signal in the case of a NLTA record. The method used by the mobile user position locator to determine enhancer usage by cell sites and/or a mobile user, involves pattern recognition except in the case of one-way RTD (i.e. no soft handoff). For the case of one-way RTD measurements, if the RTD measurement does not exceed the one way enhancer delay plus the transmission time between the donor cell site and enhancer location, it is assumed that an enhancer is not being used. All other one-way RTD measurements are ignored.

Figure 4:
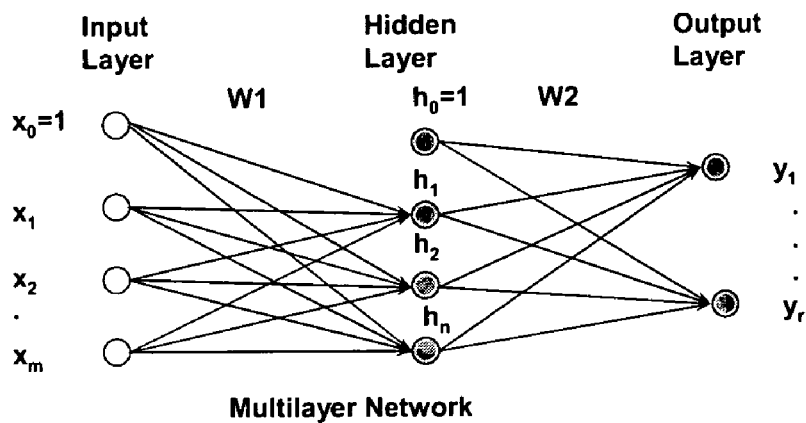
FIG. 4 is a diagram showing neural networking processing.

To analyze SBS records containing RTD measurements with at least two cell sites or NLTA records with at least three cell sites, the mobile user position locator analyzes the measurements to see if there is a pattern when the mobile/cell site is using an enhancer. Table 1 above displays both an RTD record and a NLTA record The first record consists of the top four rows of Table 1 is a 4-way soft handoff NLTA record. The second record comprising the bottom four rows of Table 1 is a 4-way soft handoff RTD record. In row 1 Site ID 227 contains a cell enhancer, but it is not obvious whether the measurements associated with ID 227 is affected by the cell enhancer. To determine if those measurements fit the pattern of an enhanced signal, a neural network is used. A diagram of a general multilayer neural network is shown in FIG. 4.

Currently the mobile user position locator 42 only handles records where at most 1 cell site has at most 1 cell enhancer. In one embodiment, the locator 42 does not handle situations where two cell sites have enhancers, or if one cell site has two enhancers. This is not a limitation of using neural networks. The neural network can be adapted to handle any number of cell enhancers. However, due to developmental time constraints, multiple cell enhancer scenarios will be handled in a future revision of the locator 42. Since there is only one decision to be made of whether or not the mobile user is using the cell enhancer, the output layer of the neural network consists of one output node. If the locator was to identify multiple enhancers, then the neural network would have as many output nodes as there are enhancers. The number of input layer nodes is equal to the number of measurements (or cell sites) plus one (one input node for the bias term).

To summarize, the mobile user position locator 42 uses a neural network that has as its inputs RTD measurements or NLTA/PSMM measurements and a single output indicating whether or not the mobile is on an enhancer. If the output approaches 1, it is likely that the mobile user is on an enhancer and if the output approaches 0, it is likely that the user is not on an enhancer. For the neural network to produce the correct result, the values of the weights w1 and w2 are known in advance. The set of weights will be different for each combination of cell sites/azimuth, hence, a table is established with precalculated weights ready to be used by the neural network to establish enhancer usage. Calculating the required weights for each cell site/azimuth combination is done off-line due to the processing time required to make these calculations The weights for the neural network is determined by a training method called backpropagation. Training the neural network requires data. The algorithm uses simulated data to train the neural network. First the algorithm generates simulated RTD or NLTA data in the scenario where the mobile is not using the enhancer. This is done by distributing possible mobile location around the midpoint between all cell sites and also within +−60 degrees of the bore sight of the site's azimuth if possible. If it is not possible to find the necessary number of points within +−60 degrees of each site's azimuth, the algorithm selects the necessary number of points located in the area that is midpoint between all the cell sites. The mobile user position locator 42 then calculates the distance between the simulated mobile position and each cell site. Once the distance to each cell site is known, in the case of NTLA data the relative delay of each arriving pilot can be calculated with respect to the site with the enhancer. In the case of RTD data, once the distance to each cell site is known, simulated RTD data can now be generated.

The same steps are performed again except now instead of using the donor cell site, the enhancer is assumed to be the source of the signal received by the mobile. The simulation assumes that the mobile is within 0.7 the distance between the enhancer and the closest cell site other than the donor.

Figure 5:
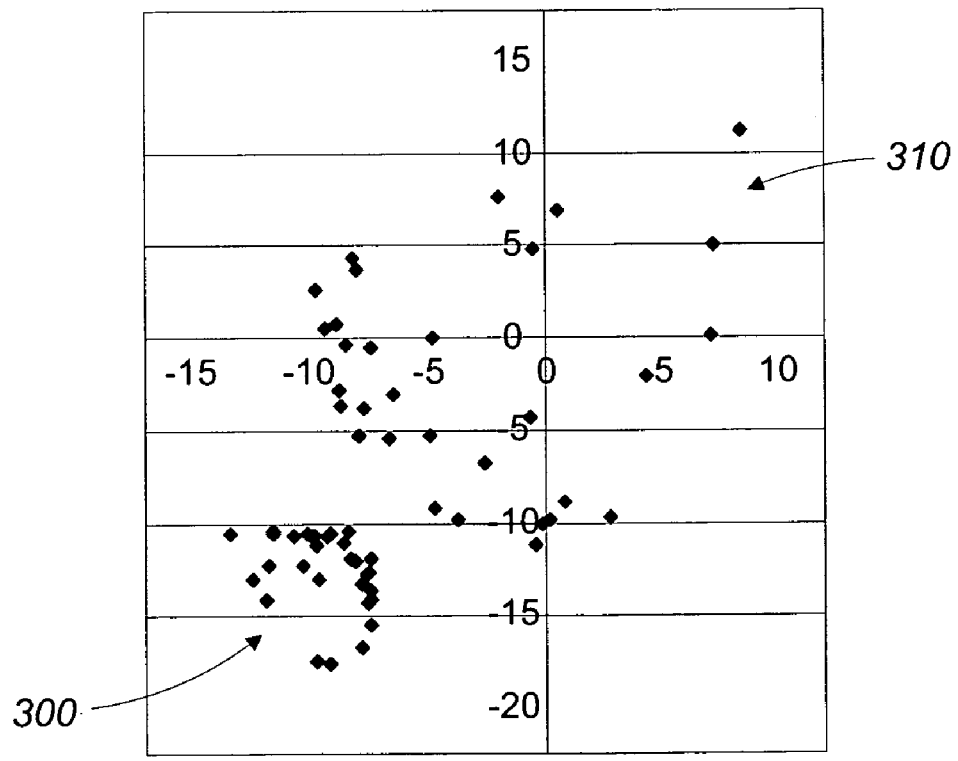
FIG. 5 is a sample trained neural network.

FIG. 5 is an example of simulated delay measurements for both the repeated and non-repeated scenario. The points $x_0 \ldots x_m$ in the lower left hand corner of FIG. 5 represents the simulated delay measurements when the mobile is receiving the signal from the enhancer while the other points represents the simulated delay measurements when the mobile is receiving the signal from the donor cell site. Is this example there is a clear dividing line separating the enhanced data from the non-enhanced data. There should be no problems training the neural network such that the total error can be chosen to be low.

Once simulated data is generated for both the enhanced and non-enhanced scenario, backpropagation training for the neural network is performed. After backpropagation is done, the actual measurement data from the SBS record is then fed into the neural network and the output of the neural network will indicate whether the measurements were affected by the enhancer.

Trained neural networks like the one shown in FIG. 5 are generated for both the RTD and NTLA measurements for the cell sites by the neural network processors 92 of FIG. 2. In FIG. 5, the cluster of simulated measurements received directly from a base station cell site are shown, for example, in at 300 in the lower left corner. The cluster of simulated measurements received through an enhancer or repeater are shown, for example, at 310 in the upper right corner. The real RTD, for multiple cell site measurements, and the real NTLA measurements are fed into the neural network processor 92 to determine if the signal is propagating through an enhancer. If the signal is propagating through an enhancer, the measurements typical fall in the vicinity of cluster 310 and are revised to reflect this and forwarded to the position estimator for position determination. If the decision network determines that no enhancer is used because the real measurement falls in the vicinity of cluster 300, then the measurements are forwarded to the position estimator for position determination.

It should be understood that many embodiments of the present invention may be readily apparent to a person skilled in the art in view of the above detailed description of this invention. Accordingly, the scope of the present invention should not be limited to the teachings of the detailed description of the invention and should be limited to the scope of the claims that follow.

What is claimed is:

1. A method of locating a mobile user in a wireless communication network comprising:

receiving a log of call history information records of the mobile user while on a call, the call history information records each comprising at least one distance related measurement parameter;

determining if the call is being routed through a repeater for each of the call history information records;

determining a position estimate of the mobile user, when the call is not routed through a repeater, based on base station cell site co-ordinates and the at least one distance related measurement; and, determining a repeater modified position estimate, when the call is routed through a repeater, by modifying the at least one distance related measurement parameter to reflect signal propagation delays associated with the repeater and utilizing the modified distance related measurement parameter with the repeater co-ordinates to determine the repeater modified position estimate.

2. The method of claim 1, wherein the at least one distance related measurement parameter is selected from the group comprising round trip delay (RTD) measurements, power strength measurement messages (PSMM), base station cell site co-ordinates, repeater co-ordinates, cell antenna azimuth, and repeater antenna azimuth, and wherein:
the determining a position estimate of the mobile user comprises utilizing base station cell site co-ordinates and an appropriate one of the RTD and PSMM measurements; and
the determining a repeater modified position estimate comprises modifying the appropriate one of the RTD and PSMM measurements to reflect signal propagation delays associated with the repeater and utilizing the modified RTD and PSMM measurements with the repeater co-ordinates to determine the modified repeater position estimate.

3. The method of claim 2, wherein the determining if the call is being routed through a repeater for a record involving a single base station cell site further comprises:
determining if the RTD measurements in one direction are less than one way delay through the repeater and transmission time from the base station cell site to the repeater, and
ignoring the RTD measurement when it is greater than one way delay through the repeater and transmission time from the base station cell site to the repeater.

4. The method of claim 3, wherein the determining a position estimate comprises triangulation using the RTD measurement and the cell antenna azimuth of the single cell site.

5. The method of claim 2, wherein the determining if a call is being routed through the repeater further comprises:
training an RTD neural network for each location between at least two cell sites with a plurality of predetermined normal and repeater enhanced RTD measurements to develop normal RTD measurement patterns and repeater enhanced RTD patterns,
comparing the RTD measurement of a call history record in the RTD neural network with normal and repeater enhanced RTD patterns to determine if the RTD measurement is being routed through the repeater,
training a PSMM neural network for each location between at least three cell sites with normal and repeater enhanced PSMM measurements to develop normal PSMM measurement patterns and repeater enhanced PSMM patterns, and
comparing the PSMM measurement of a call history record in the PSMM neural network with normal and repeater enhanced PSMM patterns to determine if the PSMM measurement is being routed through the repeater.

6. The method of claim 5, wherein the determining a position estimate and determining a repeater modified position estimate comprise:
a) where the call history record comprises a plurality of RTD measurements from a corresponding plurality of cell sites, utilizing circular trilateration using appropriate RTD and modified RTD measurements; and,
b) where the call history record comprises PSMM messages from more than three corresponding cell sites, utilizing hyperbolic trilateration using the appropriate PSMM and PSMM modified measurements.

7. The method of claim 2, wherein the determining a position estimate and determining a repeater modified position estimate comprise:
a) where the call history record comprises a plurality of RTD measurements from a corresponding plurality of cell sites, utilizing circular trilateration using appropriate RTD and modified RTD measurements; and,
b) where the call history record comprises PSMM messages from at least three corresponding cell sites, utilizing hyperbolic trilateration using the appropriate PSMM and PSMM modified measurements.

8. The method of claim 1 further comprising filtering the position estimate and repeater position estimate through a first filter to refine the position estimate and the repeater position estimate.

9. The method of claim 8 further comprising:
determining the end of the call history information and reverse filtering to thereby further refine all the refined position and repeater position estimates.

10. The method of claim 9, wherein the reverse filtering comprises a reverse Kalman filtering by comparing previous position estimates with succeeding position estimates.

11. The method of claim 8, wherein the filtering comprises a Kalman filtering by comparing a current position estimate with previous position estimates.

12. A system for locating a mobile user in a wireless communication network, the system comprising:
a decision network for determining if the call is being routed through a repeater for each of the call history information records; and,
a position estimating processor responsive to the decision network for determining a position estimate of the mobile user, when the call is not routed through a repeater, based on the base station cell site co-ordinates and at least one distance related measurement parameter, and for determining a repeater modified position estimate, when the call is routed through a repeater, by modifying the at least one distance related measurement parameter to reflect signal propagation delays associated with the repeater and utilizing the modified distance related measurements with the repeater co-ordinates to determine the modified repeater position estimate.

13. The system of claim 12, wherein the system is responsive to logs of call history information records of the mobile user while on a call comprising at least one of the distance related measurement parameter selected from the group comprising round trip delay (RTD) measurements, power strength measurement messages (PSMM), base station cell site co-ordinates, repeater co-ordinates, cell antenna azimuth, and repeater antenna azimuth; and
wherein the position estimating processor for determining a position estimate of the mobile user, when the call is not routed through a repeater, based on base station cell site co-ordinates and an appropriate one of the RTD and PSMM measurements and for determining a repeater modified position estimate, when the call is routed through a repeater, by modifying the appropriate one of the RTD and PSMM measurements to reflect signal propagation delays associated with the repeater and utilizing the modified RTD and PSMM measurements with the repeater co-ordinates to determine the repeater modified position estimate.

14. The system of claim 13, wherein the position estimate processor determines the position estimate and the repeater modified position:
  a) where the call history record comprises a plurality of RTD measurements from a corresponding plurality of cell sites, utilizing a circular trilateration algorithm using appropriate RTD and modified RTD measurements; and,
  b) where the call history record comprises PSMM messages from more than three corresponding cell sites, utilizing a hyperbolic trilateration algorithm using the appropriate PSMM and PSMM modified measurements.

15. The system of claim 12 further comprising a first filter for receiving the position estimate and repeater position estimate from the position estimating processor and for refining the position estimate and the repeater position estimate.

16. The system of claim 15 further comprising a second reverse filter for reverse filtering the position refined position estimates and repeater position estimates to further refine all the refined position and repeater position estimates.

17. The system of claim 16, wherein the second reverse filter comprises a reverse Kalman filter.

18. The system of claim 15, wherein the first filter comprises a Kalman filter.

19. The system of claim 12, wherein the decision network comprises a single cell processor for determining if the RTD measurements in one direction are less than one way delay through the repeater and transmission time from the base station cell site to the repeater, and for discarding the RTD measurement when it is greater than one way delay through the repeater and transmission time from the base station cell site to the repeater.

20. The system of claim 19, wherein the position estimating processor utilizes a triangulation algorithm using the RTD measurement and the cell antenna azimuth of the single cell site.

21. The system of claim 19, wherein the decision network comprises an RTD neural network and a PSMM neural network,
  a) the RTD neural network being trained for each location between at least two cell sites with a plurality of predetermined normal and repeater enhanced RTD measurements to develop normal RTD measurement patterns and repeater enhanced RTD measurement patterns, and the RTD neural network comprising a comparator for comparing the RTD measurement of a call history record with normal and repeater enhanced RTD measurement patterns to determine if the RTD measurement is being routed through the repeater, and,
  b) the PSMM neural network being trained for each location between at least three cell sites with normal and repeater enhanced PSMM measurements to develop normal PSMM measurement patterns and repeater enhanced PSMM patterns, and the PSMM neural network comprising a comparator for comparing the PSMM measurement of a call history record in the PSMM neural network with normal and repeater enhanced PSMM patterns to determine if the PSMM measurement is being routed through the repeater.

22. The system of claim 21, wherein the position estimate processor determines the position estimate and the repeater modified position:
  a) where the call history record comprises a plurality of RTD measurements from a corresponding plurality of cell sites, utilizing a circular trilateration algorithm using appropriate RTD and modified RTD measurements; and,
  b) where the call history record comprises PSMM messages from more than three corresponding cell sites, utilizing a hyperbolic trilateration algorithm using the appropriate PSMM and PSMM modified measurements.

23. An apparatus for locating a mobile user in a wireless communication network comprising:
  means for receiving a log of call history information records of the mobile user while on a call, the call history information records each comprising at least one distance related measurement parameter;
  means for determining if the call is being routed through a repeater for each of the call history information records;
  means for determining a position estimate of the mobile user, when the call is not routed through a repeater, based on base station cell site co-ordinates and the at least one distance related measurement; and,
  means for determining a repeater modified position estimate, when the call is routed through a repeater, by modifying the at least one distance related measurement parameter to reflect signal propagation delays associated with the repeater and utilizing the modified distance related measurement parameter with the repeater co-ordinates to determine the repeater modified position estimate.

24. The apparatus of claim 23, wherein the at least one distance related measurement parameter is selected from the group comprising round trip delay (RTD) measurements, power strength measurement messages (PSMM), base station cell site co-ordinates, repeater co-ordinates, cell antenna azimuth, and repeater antenna azimuth, and wherein:
  the means for determining a position estimate of the mobile user involves utilizing base station cell site co-ordinates and an appropriate one of the RTD and PSMM measurements; and
  the means for determining a repeater modified position estimate involves modifying the appropriate one of the RTD and PSMM measurements to reflect signal propagation delays associated with the repeater and utilizing the modified RTD and PSMM measurements with the repeater co-ordinates to determine the repeater modified position estimate.

25. The apparatus of claim 24, wherein the means for determining if the call is being routed through a repeater for a record involves a single base station cell site further comprises:
  means for determining if the RTD measurements in one direction are less than one way delay through the repeater and transmission time from the base station cell site to the repeater, and
  means for ignoring the RTD measurement when it is greater than one way delay through the repeater and transmission time from the base station cell site to the repeater.

26. The apparatus of claim 25, wherein the means for determining a position estimate comprises triangulation using the RTD measurement and the cell antenna azimuth of the single cell site.

27. The apparatus of claim 24, wherein the means for determining if a call is being routed through the repeater further comprises:
  means for training an RTD neural network for each location between at least two cell sites with a plurality of predetermined normal and repeater enhanced RTD measurements to develop normal RTD measurement patterns and repeater enhanced RTD patterns, means for comparing the RTD measurement of a call history record in the RTD neural network with normal and repeater enhanced RTD patterns to determine if the RTD measurement is being routed through the repeater, means for training a PSMM neural network for each location between at least three cell sites with normal and repeater enhanced PSMM measurements to develop normal PSMM measurement patterns and repeater enhanced PSMM patterns, and means for comparing the PSMM measurement of a call history record in the PSMM neural network with normal and repeater enhanced PSMM patterns to determine if the PSMM measurement is being routed through the repeater.

28. The apparatus of claim 27, wherein the means for determining a position estimate and of determining a repeater modified position estimate comprise:
  a) where the call history record comprises a plurality of RTD measurements from a corresponding plurality of cell sites, means utilizing circular trilateration using appropriate RTD and modified RTD measurements; and,
  b) where the call history record comprises PSMM messages from more than three corresponding cell sites, means utilizing hyperbolic trilateration using the appropriate PSMM and PSMM modified measurements.

29. The apparatus of claim 24, wherein the means for determining a position estimate and of determining a repeater modified position estimate comprise:
  a) where the call history record comprises a plurality of RTD measurements from a corresponding plurality of cell sites, means utilizing circular trilateration using appropriate RTD and modified RTD measurements; and,
  b) where the call history record comprises PSMM messages from at least three corresponding cell sites, means utilizing hyperbolic trilateration using the appropriate PSMM and PSMM modified measurements.

30. The apparatus of claim 23 further comprising means for filtering the position estimate and repeater position estimate to refine the position estimate and the repeater position estimate.

31. The apparatus of claim 30, wherein the filtering means comprises a Kalman filter for comparing a current position estimate with previous position estimates.

32. The apparatus of claim 31, wherein the reverse filtering means comprises a reverse Kalman filter for comparing previous position estimates with succeeding position estimates.

33. The apparatus of claim 23 further comprising:
  means for determining the end of the call history information and reverse filtering to thereby further refine all the refined position and repeater position estimates.

* * * * *